United States Patent
Brown et al.

(10) Patent No.: US 9,647,722 B2
(45) Date of Patent: May 9, 2017

(54) ADAPTIVE LINE EQUALIZER FOR IMPROVING DATA COMMUNICATION OVER LESS THAN PERFECT POWER LINES OR TRANSMISSION LINES

(71) Applicant: Dockon AG, San Diego, CA (US)

(72) Inventors: Forrest Brown, Carson City, NV (US); Alexandre Dupuy, San Diego, CA (US); Patrick Rada, San Diego, CA (US)

(73) Assignee: DOCKON AG, Zurich (CH)

( * ) Notice: Subject to any disclaimer, the term of this patent is extended or adjusted under 35 U.S.C. 154(b) by 419 days.

(21) Appl. No.: 14/214,371

(22) Filed: Mar. 14, 2014

(65) Prior Publication Data

US 2014/0269860 A1 Sep. 18, 2014

Related U.S. Application Data

(60) Provisional application No. 61/798,681, filed on Mar. 15, 2013.

(51) Int. Cl.
*H03H 7/30* (2006.01)
*H04B 3/54* (2006.01)
*H04B 3/14* (2006.01)

(52) U.S. Cl.
CPC .............. *H04B 3/54* (2013.01); *H04B 3/148* (2013.01); *H04B 3/145* (2013.01)

(58) Field of Classification Search
CPC ....................................................... H04B 3/54
USPC ......................................................... 375/232
See application file for complete search history.

(56) References Cited

U.S. PATENT DOCUMENTS

| | | | |
|---|---|---|---|
| 2,932,709 A | 4/1960 | Budd et al. | |
| 3,260,968 A * | 7/1966 | Drapkin | B29D 7/01 333/139 |
| 3,838,364 A | 9/1974 | Kurokawa et al. | |
| 5,055,795 A | 10/1991 | Kasper et al. | |
| 5,300,838 A | 4/1994 | Elizondo | |
| 6,225,874 B1 * | 5/2001 | Kerley | H03K 17/007 333/104 |
| 6,495,998 B1 | 12/2002 | Terreault | |

(Continued)

*Primary Examiner* — Lihong Yu
(74) *Attorney, Agent, or Firm* — Baker & Hostetler LLP

(57) ABSTRACT

Systems and methods for improving data communication over less than perfect power lines or transmission lines are described. The systems and methods allow for pushing out electrically any null within a frequency range of interest and/or for lossless transmission by providing impedance matching between communication devices and the transmission line. This is achieved by implementing line equalizing modules within the transceivers, at the transmitter side and/or the receiver side, or by plugging, as a stand-alone module, into an electrical outlet within a building. The line equalizing module includes multiple inductor-capacitor cells coupled in cascade where multiple switches allow for selective and concurrent connection between the inductor-capacitor cells. In another embodiment, the line equalizing module includes variable inductor-capacitor cells. The line equalizing module provides a variable propagation delay that allows for stretching electrically the transmission line. Further improvement may achieve by adjusting the operational frequency using an up-conversion or down-conversion operation.

11 Claims, 41 Drawing Sheets

(56) References Cited

U.S. PATENT DOCUMENTS

| | | | |
|---|---|---|---|
| 6,531,985 B1 * | 3/2003 | Jones .................... | G06F 1/1616 343/700 MS |
| 7,239,971 B2 | 7/2007 | Miller | |
| 2003/0218578 A1 | 11/2003 | Ahern et al. | |
| 2010/0259437 A1 * | 10/2010 | Dixon .................... | G01S 19/21 342/16 |

* cited by examiner

ADAPTIVE LINE EQUALIZER FOR IMPROVING DATA COMMUNICATION OVER LESS THAN PERFECT POWER LINES OR TRANSMISSION LINES

This application claims the benefit of and is a non-provisional of U.S. Provisional Application Ser. No. 61/798,681 filed on Mar. 15, 2013, which is hereby expressly incorporated by reference in its entirety for all purposes.

BACKGROUND OF THE DISCLOSURE

The present invention generally relates to data communication and, but not by way of limitation, to adaptive line equalizers or line stretcher to improve analog, digital and radio frequency (RF) transmission over various types of transmission mediums.

In recent years, the need to facilitate communication and interoperability among devices present inside or within the close vicinity of a building has led to the development of Home Area Networking (HAN). In this way, digital devices gain enhanced prominent capabilities which may be used to increase quality of life in variety of ways, such as for example, enhanced home security, providing entertainment services with easier access, full automation of repetitious task, and providing smart houses with fully networked structures.

To achieve full connectivity both wired and wireless technologies may be used in Home Area Networking (HAN). Home networking may use Ethernet cables, cable lines, telephone lines, power lines, fiber optics or any other type of transmission line, and Wi-Fi wireless LAN connections. A cost-effective alternative to wireless networking or installing additional network cable is the use of existing home wiring as a network medium. FIG. 1 depicts an embodiment of a Home Area Networking (HAN) 100 where different household appliances and smart devices, such as for example network printers and handheld mobile computers (i.e., cell phones, tablets, laptops, etc.) are connected to a power line network. This structure allows for remotely accessing and controlling the household appliances through handheld mobile devices which are connected to 3G or 4G Internet.

Most wired network infrastructures found in buildings currently utilize twisted copper-pair or coaxial-based transport system. Other types of conductors may also be used in wired networks. Table I summarizes electrical characteristics (characteristic impedance, shunt capacitance per unit length, series inductance per unit length, propagation delay, inner conductor diameter, outer conductor diameter, velocity, and attenuation per unit length, etc.) for various types of conductors used in wired networks. It should be noted that the electrical characteristics of power line twisted pair cables ($4^{th}$-$6^{th}$ rows from Table I) and Ethernet differential twisted pair cables ($7^{th}$-$8^{th}$ rows from Table I) are calculated from twisted pair equation.

TABLE I

Examples of Various Conductors and their Electrical Characteristics

| Conductor | Type | C' pF/m | L' nH/m | Zo Ω | Td ns/m | Conductor Diameter mm | Separ. mm | Er | norm velocity % | Att' @ 1000 MHz dB/100 m |
|---|---|---|---|---|---|---|---|---|---|---|
| 50Ω Coax cable | RG58U | 101.0 | 252.0 | 50 | 5.1 | | | | 66.6 | 47.6 |
| 75Ω Coax cable | RG59U | 67.3 | 429.8 | 75 | 5.1 | | | | 66.0 | 39.4 |
| 93Ω Coax cable | RG62A/U | 145.3 | 1252.6 | | 4.0 | | | | 84.0 | 28.5 |
| Power line "twisted pair" (phase, neutral) | | 33.9 | 655.0 | 138.9 | 4.7 | 1.5 | 4 | 2 | | |
| Power line "twisted pair" (phase, neutral) | | 16.1 | 1033.7 | 253 | 4.1 | 1.5 | 10 | 1.5 | | |
| Power line "twisted pair" (phase, neutral) | | 9.9 | 1680.0 | 411 | 4.1 | 1.5 | 50 | 1.5 | | |
| Ethernet diff. twisted pair (diff. Imp.) | | 46.9 | 473.3 | 100 at f > 100 KHz | 6.7 @ f > 100 KHz | 0.56 | 1 | 2 | | |
| Ethernet diff. twisted pair (diff. Imp.) | | | | 600 at 1.5 KHz | | | | | | |
| Shielded Ethernet diff. twisted pair | | | | 150 | about 10 | | | | | |
| Parallel aerial 2-wire | | 6.8 | 1640.0 | 491 | 3.33 | 10 | 300 | 1 (air) | | |

The frequency response of twisted pair cables and power lines in a residential dwelling are shown, respectively, in FIGS. 2-3. As shown in FIG. 2, the useful frequency band for the nominal impedance of a twisted pair cable (500Ω) ranges from about 3 kHz to about 1 MHz. On the other hand, for high speed data communication, the useful frequency bandwidth of power lines with an impedance characteristic of 75Ω ranges from about 4 MHz to about 30 MHz. It is to be understood that the frequency response of the power lines is measured while the power lines are connected to various household appliances.

One of the main challenges with home networking relying on power line communication technology is how to deal with electrical noise which is injected into the system from standard household appliances. Whenever any appliance (i.e., refrigerator, television, HVAC, etc.) is turned on or turned off, it creates some variation or noise in the transmission path that could disrupt data transfer through the wiring. In addition, the transmission path itself may hold a voltage or high current, and may act as a controlled impedance line having one or multiple branches or sub-branches with open or terminated stubs. Moreover, some electrical outlets in the building may be open, with no devices connected to it, or they may have extension cords interconnected to provide power to a device. All the above-mentioned configurations may create or inject noises into the system that can severely disrupt data communications.

BRIEF DESCRIPTION OF THE DRAWINGS

The present disclosure is described in conjunction with the appended figures.

Figure 1:
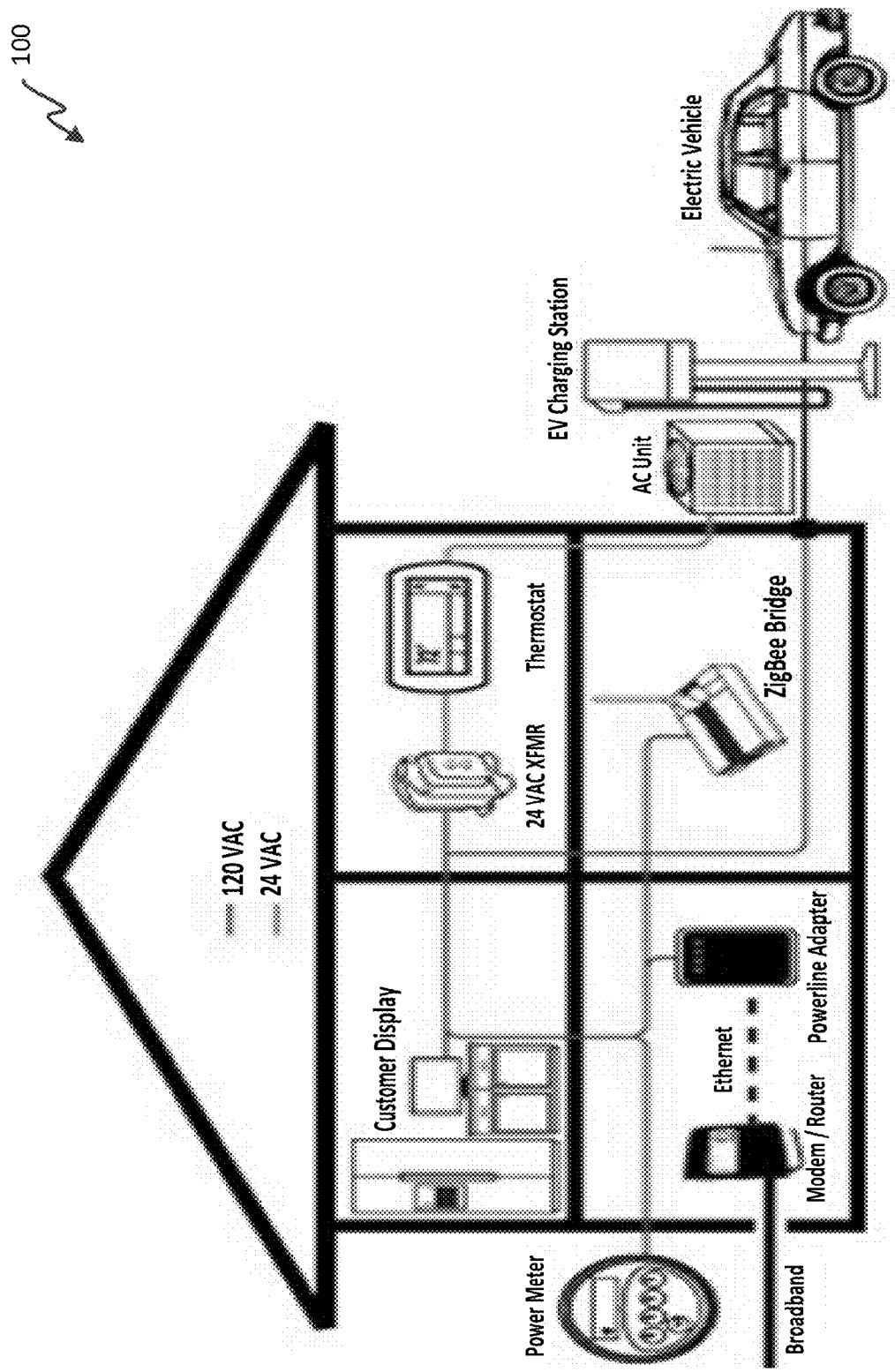
FIG. 1 depicts an example of a Home Area Networking (HAN).
Figure 2:
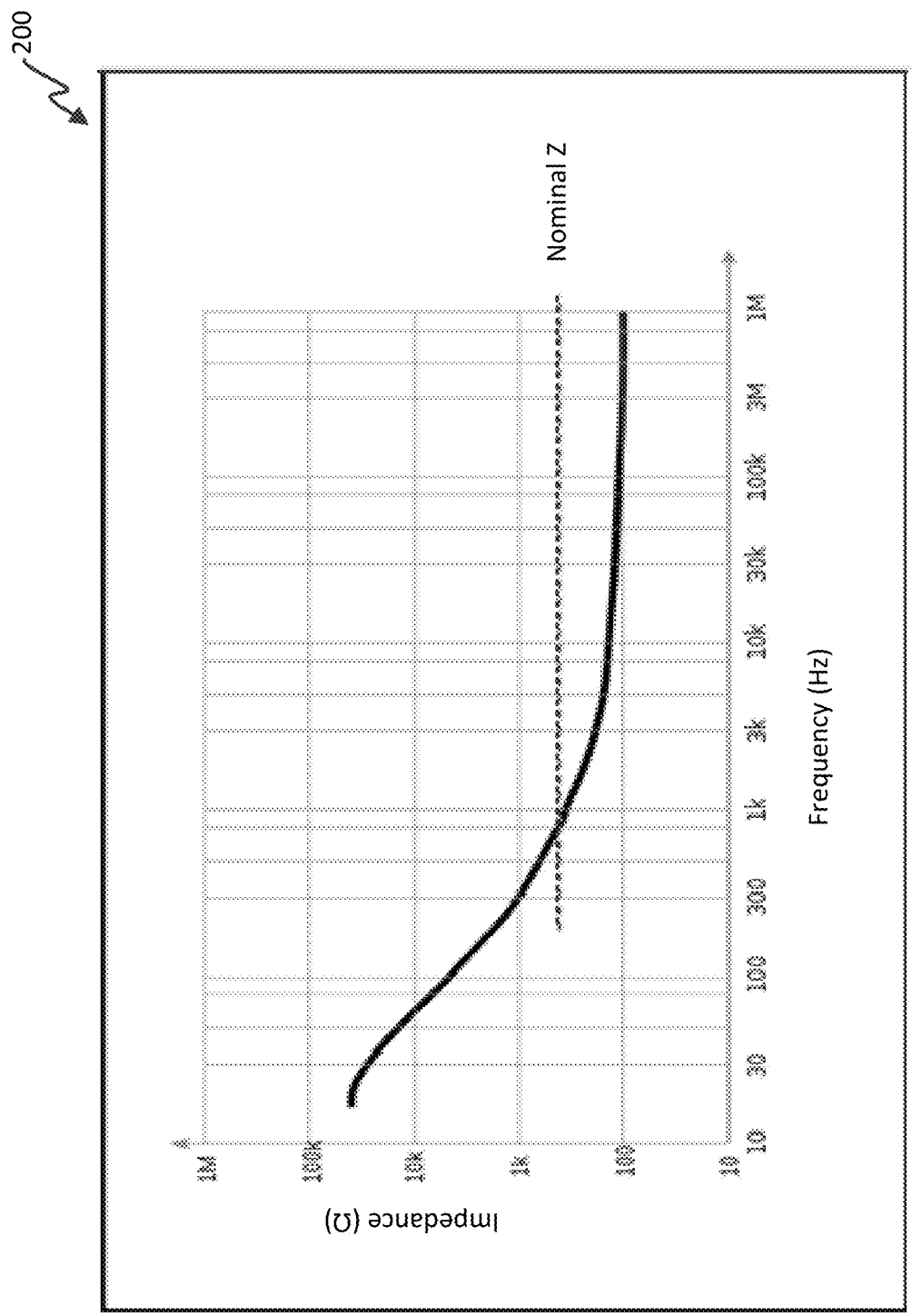
FIG. 2 is a graph showing the characteristic impedance of a twisted pair cable as a function of frequency.
Figure 3:
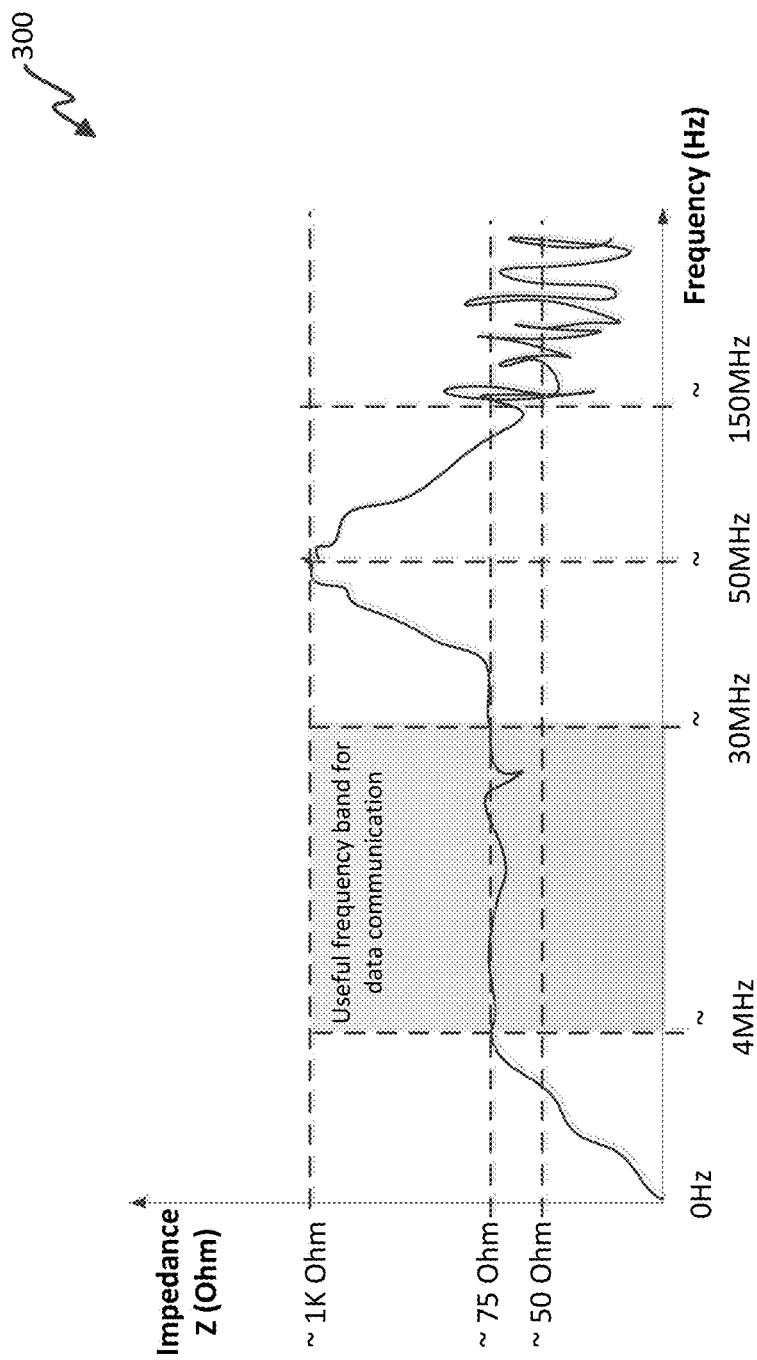
FIG. 3 is a graph showing the characteristic impedance of power line cables as a function of frequency.

In the appended figures, similar components and/or features may have the same reference label. Further, various components of the same type may be distinguished by following the reference label by a dash and a second label that distinguishes among the similar components. If only the first reference label is used in the specification, the description is applicable to any one the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment(s) of the disclosure. It should be understood that various changes may be made in the function and arrangement of elements without departing from the spirit and scope of the invention as set forth in the appended claims.

This disclosure relates in general to data communication between digital devices within a building or residence. More specifically, it relates to a new process and method for improving the quality of signal over less than perfect or imperfect power lines or transmission lines using an adaptive line equalizing module (LEM) which includes a line equalizer (LE) or line stretcher (LS).

Embodiments of the present invention are directed to a system and method for equalizing a line of communication within the entire radio frequency (RF) range for analog and digital data communications. This is achieved through implementation of two methods. The first method according to the present invention pushes out electrically any null or imperfections affecting data communication within the frequency range of interest. The second method according to the present invention matches the impedance of the communication device to the average impedance of the transmission line so as to maximize the transfer of energy between the communication device and the transmission line. In this way, the reflected signal on the transmitter and the degradation of signal integrity or shape are minimized while the transmitted signal or throughput is maximized. As will be described further below in various embodiments, both methods may be implemented by incorporating a line equalizing module (LEM), which includes the adaptive line equalizer (LE) or line stretcher (LS) according to the embodiments of the present invention, within the transmission path.

When a communication session is established between two digital devices of a Home Area Networking (HAN) on a transmission line, i.e., power lines, each digital devices represents a transmitter-receiver apparatus (transceiver). As explained above, the data transmission may be disrupted due to the existence of open lines which causes substantially slower data rate. In order to improve the quality of signal over the radio frequency (RF) data link, the impedance of communication devices may be changed in several locations. In one embodiment, it is possible to improve the quality of signal by changing the impedance of the transmitter device only. In another embodiment, it is possible to improve the quality of signal by changing the impedance of the receiver device only. In an alternative embodiment, the quality of signal may be improved by changing the impedance of both transmitter and receiver devices.

By incorporating a line equalizing module (LEM) into the transmission path, according to the embodiments of the present invention, many improvements in data communication process may be achieved. By way of example, these improvements may include reaching higher data rate because of a minimized bit error rate (BER). In this way, the improved throughput can be increased by 30%. In addition, the transmission range may increase for a given throughput data, which minimizes the electromagnetic interference (EMI) noise injected into the home networking. This results in improving the quality of signal over the data communication link which leads to reducing the return of merchandise authorization (RMAs) and complaints at the end user client side.

The present invention has applications in numerous areas, such as for example, industrial, commercial, or individual environments. According to the embodiments of the present invention, the effective throughput and propagation range for residential power line communication may achieve a data rate of 150 Mbps, versus a sub-performance data rate of 35 Mbps, for an estimated maximum bandwidth of 200 Mbps network-based product services. For a power line communication system, which may use the infrastructure of existing power distributions systems (utility or industrial), a 10 Mbps data rate may reach over 3 miles instead of 1.5 miles. Digital Subscriber Line (DSL) based communication systems may provide new high speed services (12 Mbps) to their fringe customers, both commercial and residential, with coverage of 1200-2000 feet or more. Other examples in which the effective throughput and propagation range may improve according to the embodiments of the present invention may include cable internet access having many branches including old and unused lines and electrical utility cables, including aerial or buried power distribution. Data communication in commercial buildings using long Ethernet cables may also benefit from higher throughput and longer propagation range.

In the following, various embodiments of a line equalizing module (LEM) which includes an adaptive line equalizer (LE) or a line stretcher (LS) according to the present invention is explained in detail. A line equalizer (LE) or line stretcher (LS) mimics an ideal lossless transmission line that can be modeled by a succession of infinitesimal LC cells (distributed parameter circuit). This principal was used in the early age of telephony to create an intrinsic higher order low pass filter for reducing the audio bandwidth (~3 KHz) while filtering the noise. By keeping the L/C ratio constant for each of the LC cells, the propagation delay of each cell can be defined by the actual value of the LC product. In this way, a precise propagation delay with a resolution of N bits may be created if each cell is arranged with a binary sequence of values. By way of example, the first cell may include a first series inductance $L_1$ and a first shunt capacitor $C_1$, a second cell may include a second series inductance $L_2$ and a second shunt capacitance $C_2$, . . . , and an Nth (N being an integer greater than 2) cell may include the Nth series inductance $L_N$ and the Nth shunt capacitance $C_N$.

The frequency response curve of the line equalizer (LE) or the line stretcher (LS) is a low pass filter which allows the transmission of low frequency signals from 0 Hz to its cutoff frequency ($F_C$) while blocking the higher frequency signals. By carefully selecting the inductance and capacitance values of each LC cells, one can design a line equalizing module (LEM), line equalizer (LE) or line stretcher (LS), such that signals with frequency components below the cutoff frequency (Fc) of the line equalizing module (LEM) will pass unaffected while signals with frequency components above this cutoff frequency (Fc) will be strongly attenuated. It should be understood that when the order of the low pass filter increases, the transition from pass band (low attenuation) to the stop band (high attenuation) becomes sharper as is well known in the art.

Figure 4:
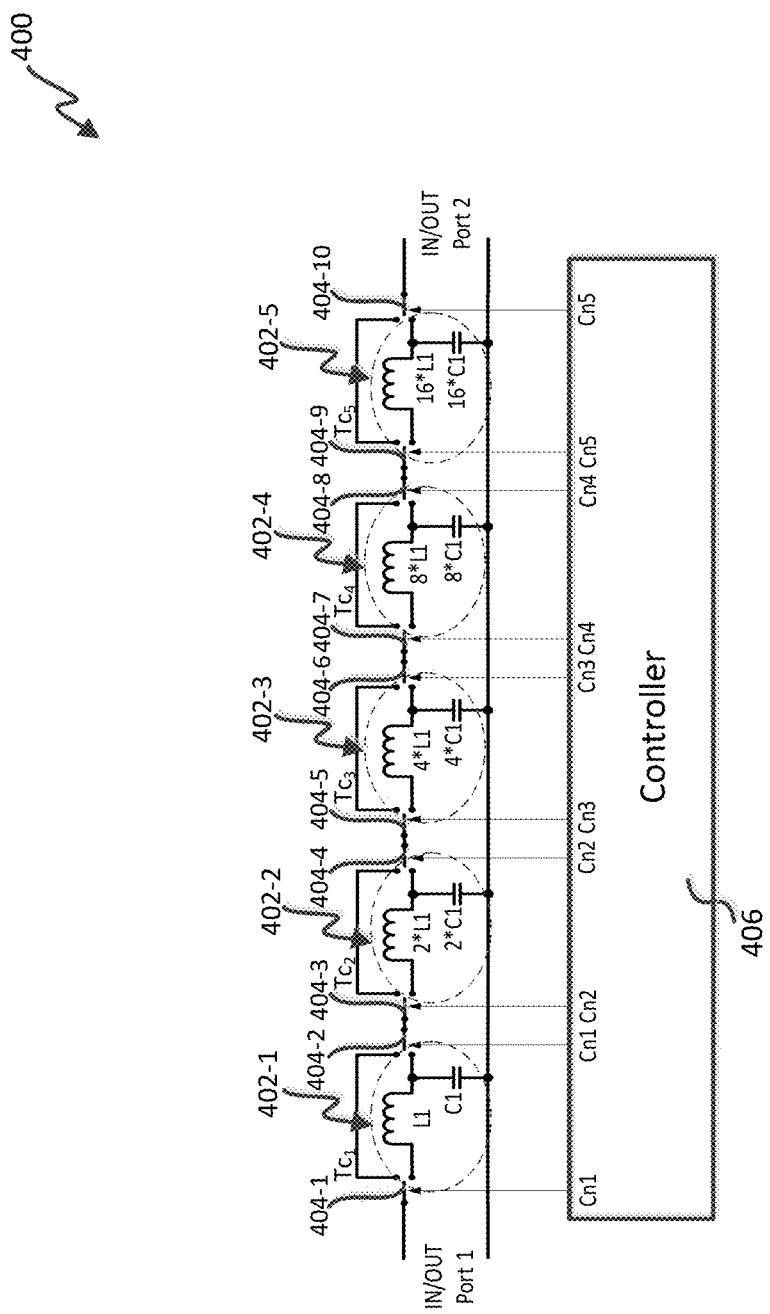
FIG. 4 illustrates schematic diagram of an embodiment of a line equalizing module.

With reference to FIG. 4, a schematic diagram of an embodiment of a line equalizing module 400 is shown. In this exemplary embodiment, the line equalizing module 400 includes five LC cells 402 cascaded in series where each of the LC cells 402 is coupled to two single pole double throw (SPDT) switches 404 (10 switches in total). Thus, in a case where the line equalizing module 400 includes N (N being an integer greater than 2) LC cells 402, the total number of SPDT switches 404 is two times the total number of LC cells 402 (2*N). As shown in this figure, the input and output of each of the LC cells 402 is coupled to a separate SPDT switch 404 with a common terminal ($Tc_i$). In this way, each of the LC cells 402 may be selectively chosen within the line equalizing module 400 in response to a control signal ($C_{ni}$). A control circuit 406 is used to generate the required binary control signals ($C_{ni}$="1" or "0") for each of the SPDT switches 404. It should be noted that the same control signal ($C_{ni}$) is used for each of the SPDT switches 404 that are placed at both input and output of each LC cell 402. As explained above, for each of the LC cells 402, the value of series inductance and the shunt capacitance per unit length are chosen so that the $L_i/C_i$ ratio between each LC cells 402 is kept constant. In this embodiment, the first cell may include a first series inductance $L_1$ and a first shunt capacitor $C_1$, the second cell may include a second series inductance $L_2=2*L_1$ and a second shunt capacitance $C_2=2*C_1$, the third cell may include a third series inductance $L_3=4*L_1$ and a third shunt capacitance $C_3=4*C_1$, the forth cell may include a fourth series inductance $L_4=8*L_1$ and a fourth shunt capacitance $C_4=8*C_1$, and the fifth cell may include a fifth series inductance $L_5=16*L_1$ and a fifth shunt capacitance $C_5=16*C_1$.

Barring any dissipative effects such as dielectric "leakage" and conductor resistance, the characteristic impedance for each of the LC cells 402 from the line equalizing module 400 is equal to the square root of the ratio of the cell's inductance per unit length divided by the cell's capacitance per unit length.

$$Z_{0-i}|_{i=1,\ldots,N} = \text{sqrt}(L_i/C_i) = cte \quad (1)$$

Propagation delay, which is the length of time that it takes for the signal to propagate through each LC cell 402, can be determined by the following equation, given the cell's inductance and cell's capacitance per unit length:

$$\text{Delay}\_T_1|_{i=1,\ldots,N} = \text{sqrt}(L_i * C_i) \quad (2)$$

Therefore, the velocity of propagation through each cell and the low pass cutoff frequency may be respectively defined as follows:

$$v_i|_{i=1,\ldots,N} = 1/\text{sqrt}(L_i * C_i) \quad (3)$$

$$F_{c-i}|_{i=1,\ldots,|\ldots,N} = 1/(\text{pi}*(\text{sqrt}(L_i*C_i))) \quad (4)$$

By using the above-mentioned equations, the capacitance per unit length ($C_i$) and the inductance per unit length ($L_i$) for each LC cell 402 can be determined as follows:

$$C_i = 1/(2*\pi*F_{c-i}*Z_{0-i}|_{i=1,\ldots,N}) \quad (5)$$

$$L_i = (Z_{0-i}|_{i=1,\ldots,N})^2 * C_i \quad (6)$$

As discussed above and also shown in the above formulas, while the characteristic impedance ($Z_{0-i} = L_i/C_i$) of each LC cell 402 is kept constant, the propagation delay for each cell is defined by its $L_iC_i$ product. In this embodiment, multiple LC cells may be coupled in series without any mismatch, therefore, N (N being an integer greater than 2) cells of the same impedance, i.e., 75 Ohm, may be coupled in series if their $L_i/C_i|_{i=1,\ldots,N}$ ratio are the same value.

Figure 5A:
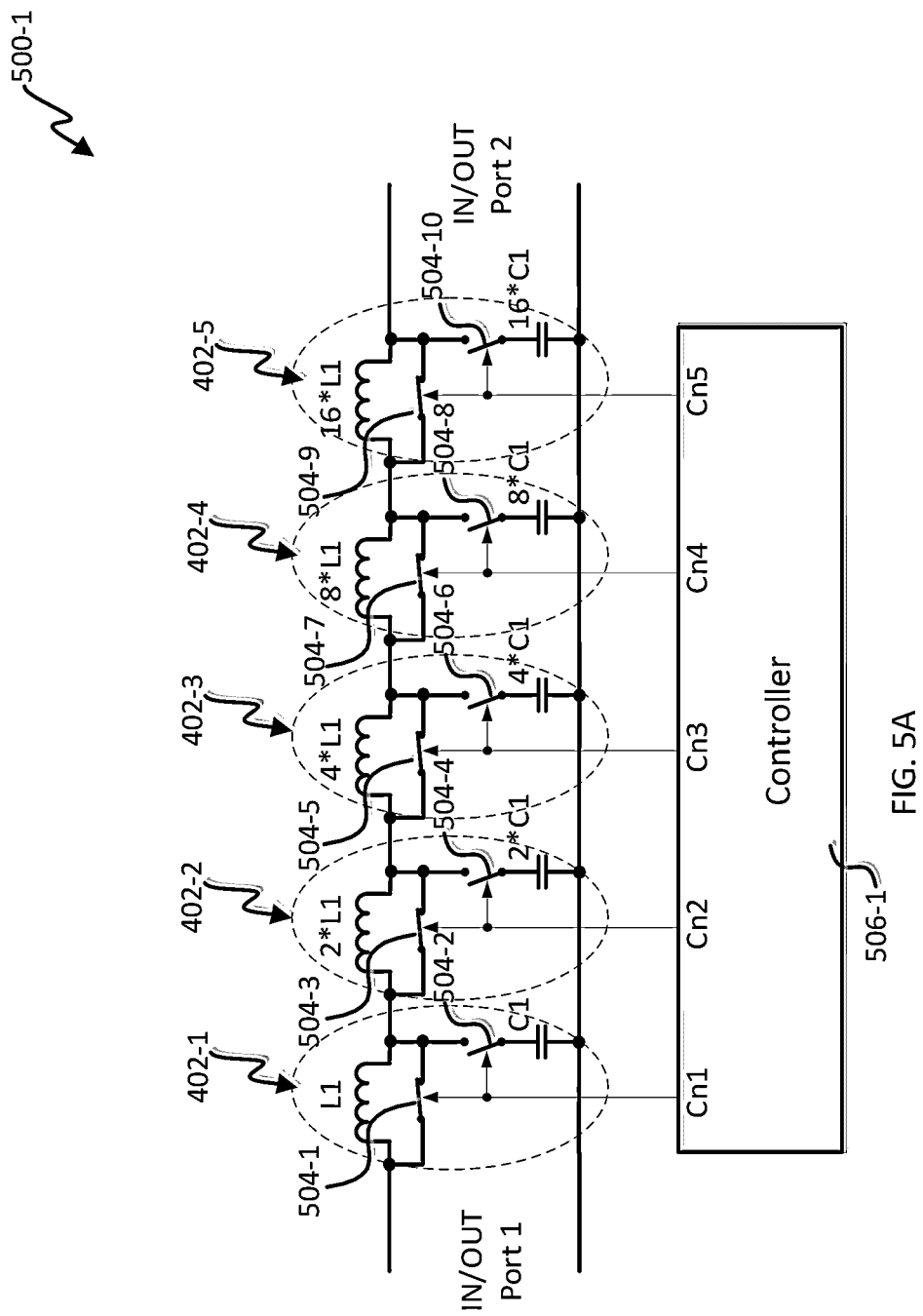
FIGS. 5A and 5B illustrate schematic diagrams of alternative embodiments of the line equalizing modules.

Referring next to FIG. 5A, a schematic diagram of an alternative embodiment of the line equalizing module 500-1 is shown. In this preferred embodiment, two single pole single throw (SPST) switches 504 are used for each of the LC cells 402 to selectively couple the input of the LC cell 402 to its respective output in response to the binary control signal ($C_{ni}$). As can be seen in FIG. 5A, in each of LC cells 402, one SPST switch 504 is coupled to the series inductance in parallel while the other SPST switch 504 is coupled to the shunt capacitance in series. In this way, the total number of SPST switches 504 is two times the total number of the LC cells 402 (2*N). Similar to the embodiment shown in FIG. 4, the line equalizing module 500-1 includes five LC cells 402, and therefore, ten SPST switches 504 are used for selecting each one of the LC cells 402. It should be noted that SPST switches 504 are more cost-effective than their counterparts, SPDT switches 404, and they are also simpler to control.

Figure 5B:
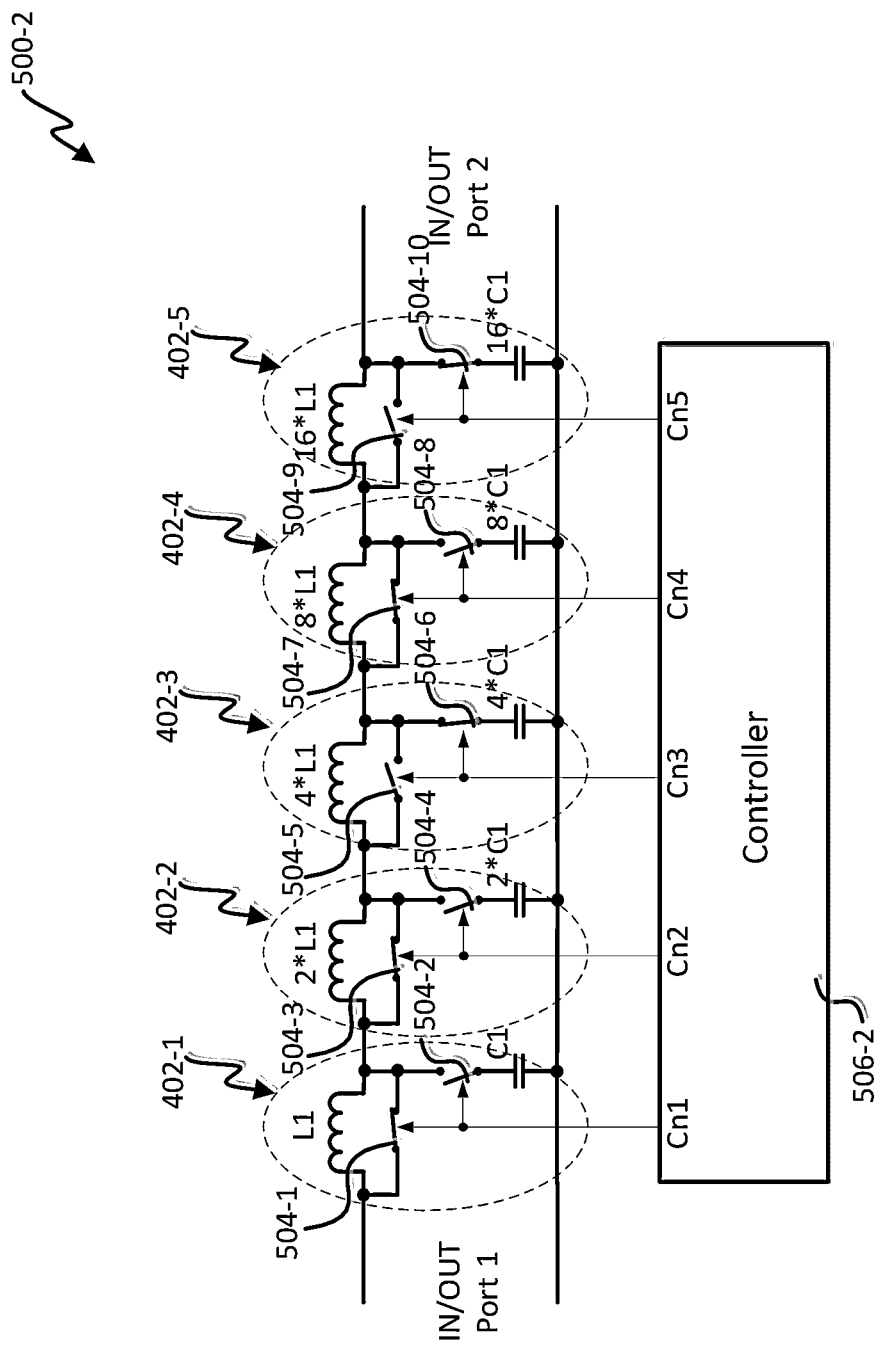

FIG. 5A illustrates an embodiment where all the SPST switches 504 in the capacitors' path are open and all the SPST switches 504 coupled to the cells' inductances are closed. This is equivalent to an all-pass circuit where all the control signals are off ($C_{n1}=C_{n2}=C_{n3}=C_{n4}=C_{n15}=$"0"). Contrary to this, if all the control signals are on ($C_{n1}=C_{n2}=C_{n3}=C_{n4}=C_{n15}=$"1"), all the five LC cells 402 are active and are placed in series. FIG. 5B, illustrates an alternative embodiment of the line equalizing module 500-2 where the LC cell numbers three and five are activated while the LC cell numbers one, two, and four are bypassed. It should be noted that the embodiments described herein are not limited to using five LC cells 402 and any number of LC cells 402 may be used. In addition, the SPDT and SPST switches 404 and 504 may be implemented as mechanical relays, electro-mechanical relays, and semiconductor relays. In one preferred embodiment, the SPDT and SPST switches 404 and 504 are field-effect transistors (FET) based on complementary metal-oxide-semiconductor (CMOS) technology). It should be understood that the above-mentioned embodiments is intended to be illustrative and not exhaustive. Many other variations and alternative configurations may be used by one of ordinary skill in the art without departing from the scope or spirit of the invention.

Figure 6A:
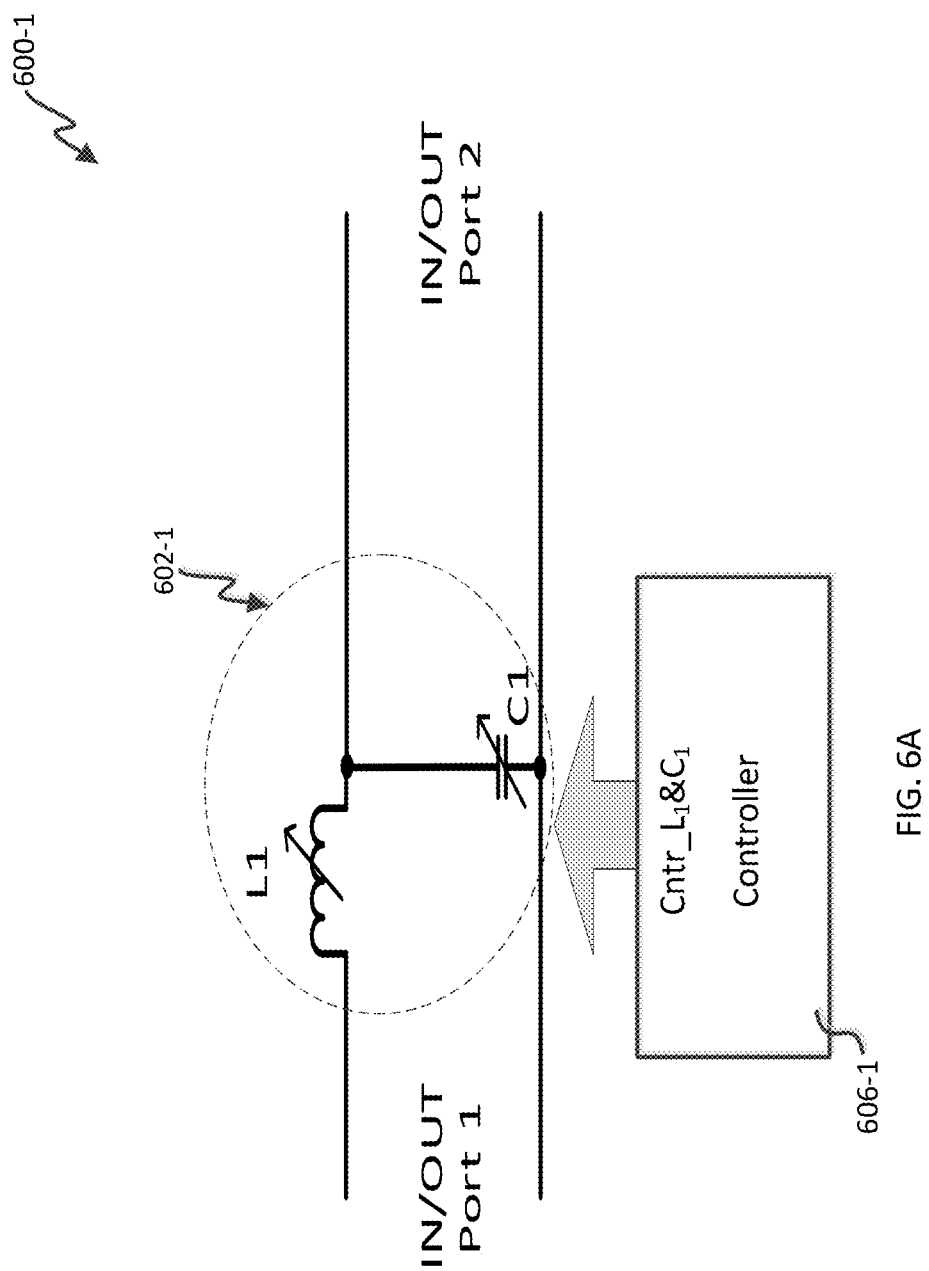
FIGS. 6A, 6B, and 6C illustrate schematic diagrams of alternative embodiments of the line equalizing modules.

Referring next to FIG. 6A, a schematic diagram shows another alternative embodiment of a line equalizing module 600-1. In this embodiment, the LC cells 402 with constant LC values are replaced by one variable LC cell 602-1. The variable LC cell 602-1 may include a variable series inductance L1 connected to a variable shunt capacitance C1. Both variable inductance L1 and variable capacitance C1 are operable independent of each other, and each may be adjusted electronically. This results in an adjustable propagation delay defined by square root of LC product $\Phi=(\text{sqrt}(L1*C1))$. The characteristic impedance of the line equalizing module 600-1 is also equal to square root of LC ratio $Z_0=(\text{sqrt}(L1/C1))$.

The variable LC cell 602-1 acts as a low pass filter, but using only one variable LC cell 602-1 may limit the frequency bandwidth of the line equalizing module 600-1. As will be described further below, in the simulation results section of the disclosure, the bandwidth limitation may be corrected by cascading multiple lower values of variable series inductances and variable shunt capacitances leading to the same propagation delay and characteristic impedance but pushing out the cutoff frequency of the low pass filter to a higher range.

Figure 6B:
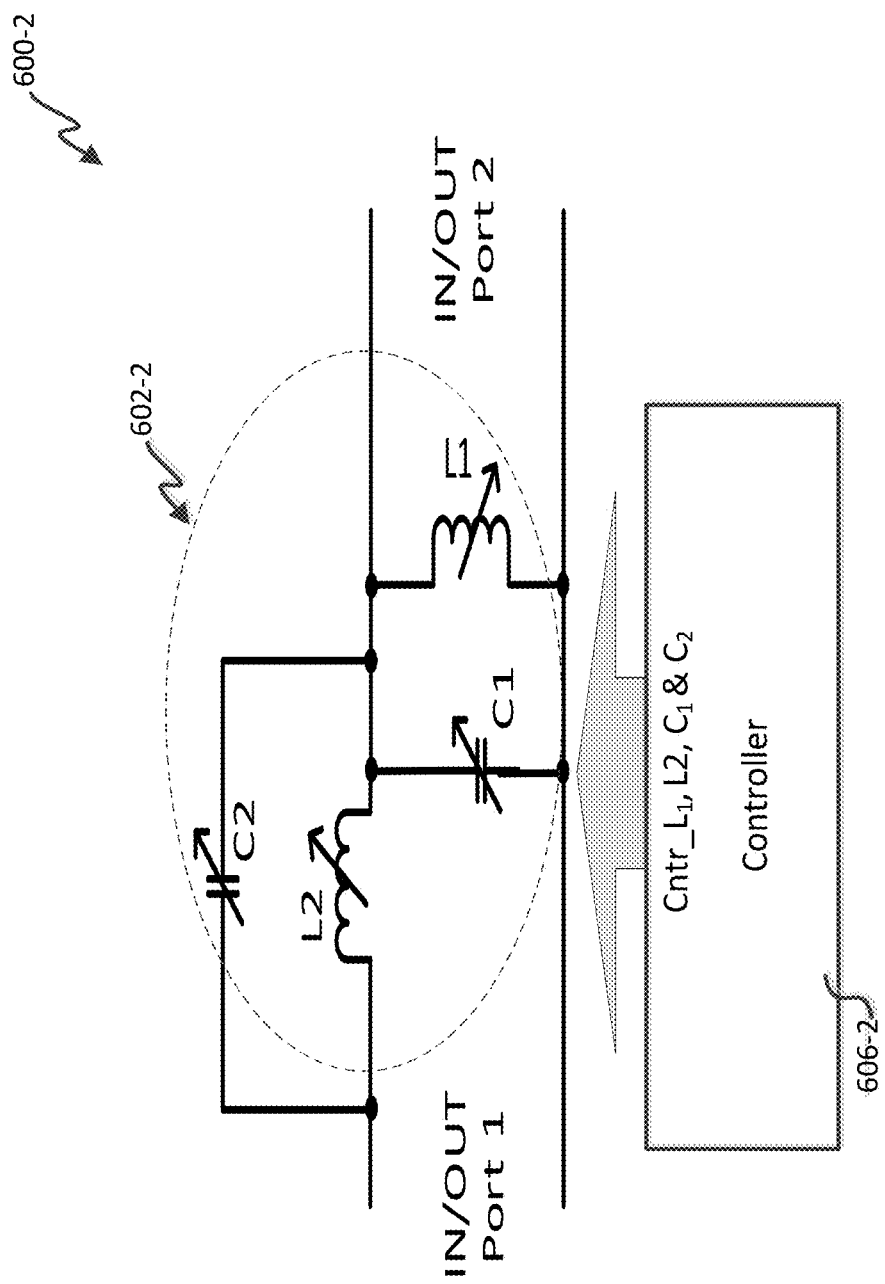

With reference to FIG. 6B, a schematic diagram of yet another embodiment of the line equalizing module 600-2 is shown. In this embodiment, the variable LC cell 602-1 of the embodiment shown in FIG. 6A is replaced by a variable band pass filter 602-2. As shown in FIG. 6B, the variable band pass filter 602-2 may include a first variable inductance $L_1$ coupled in parallel to a first variable capacitance $C_1$, connected in series with a second variable inductance $L_2$ coupled in parallel to a second variable capacitance $C_2$. This embodiment provides advantages in that the propagation delay may be created with both phase lag and phase advance which correspond, respectively, to slower or faster propagation delays. In addition, this embodiment allows for correcting up to two nulls by adjusting the frequency response of the filter at multiple frequencies.

Figure 6C:
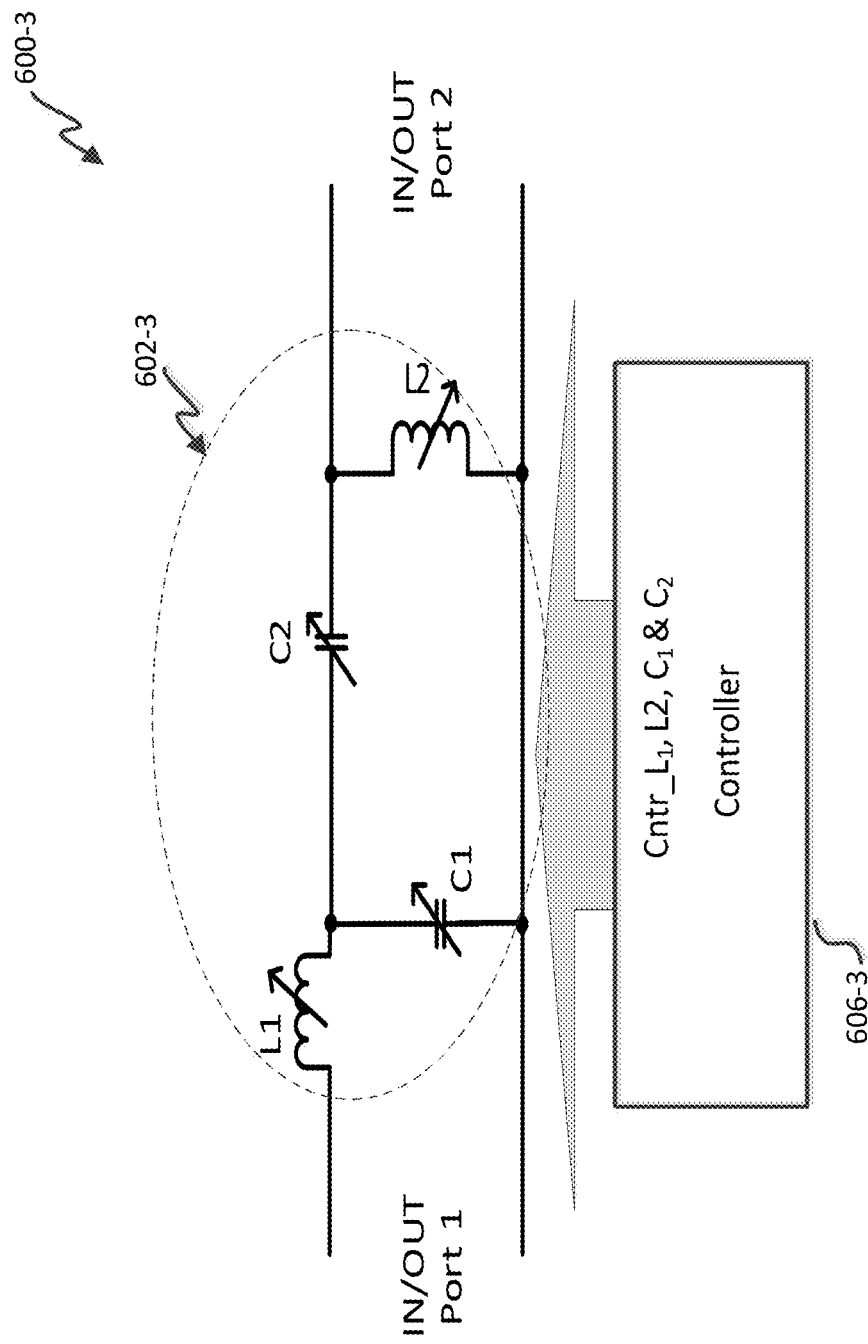

FIG. 6C illustrate a schematic diagram of yet another alternative embodiment of the line equalizing module 600-3. In this embodiment, the variable LC cell 602-3 may include two cascaded variable LC cells. The first variable LC cell is a low pass filter which consists of a variable series inductance $L_1$ connected to a variable shunt capacitance $C_1$. The second variable LC cell is a high pass filter which consists of a variable series capacitance $C_2$ connected to a variable shunt inductance $L_2$. This embodiment provides advantages similar to those explained above with respect to the embodiment of FIG. 6B, namely, creating propagation delays with both phase lag and phase advance as well as allowing for correction up to two nulls by adjusting the frequency response of the filter at multiple frequencies. It should be understood that multiple variable LC cells 602-3 may be connected in cascade, which will result in correction of up to N (N being the total number of the cascaded variable LC cells 602-3) times two nulls within the frequency range of interest.

Figure 7:
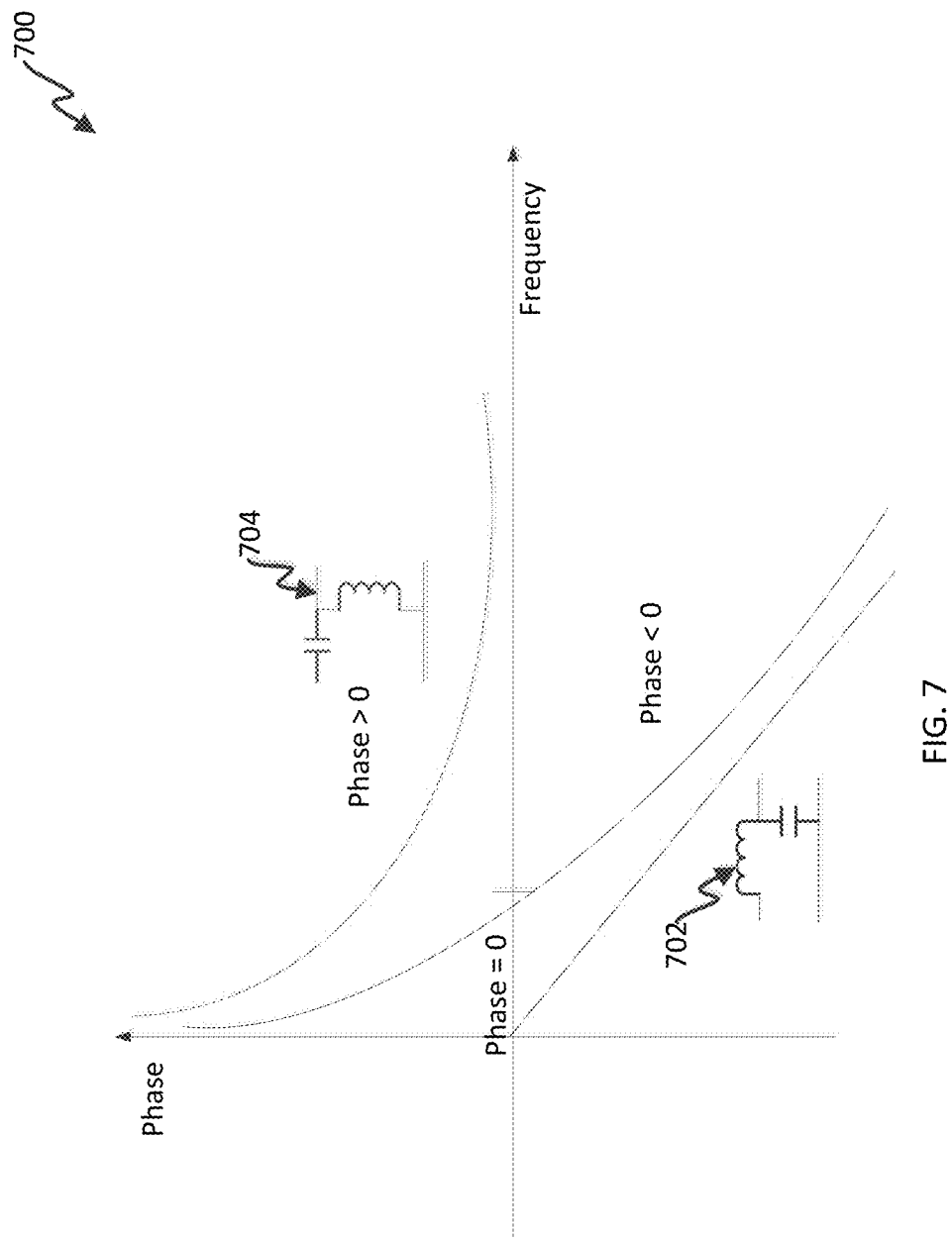
FIG. 7 is a diagram showing a phase of the frequency response profile for alternative embodiments of the line equalizing module.

With reference to FIG. 7, a phase of the frequency response profile for alternative embodiments of the line equalizing modules 600-2 and 600-3 is shown. As can be seen from this frequency response profile, the propagation delay created using the alternative embodiments of the line equalizing modules 600-2 and 600-3, described in FIGS. 6B and 6C, may be either positive or negative depending on the operating frequency band and the values of each variable LC components, i.e., $L_1$, $C_1$, $L_2$, and $C_2$. In this way, the adjustment of the variable LC components allows for lagging or advancing the signal by a specific time, and therefore, creating either positive or negative propagation delay versus the nominal or expected delay. As shown in FIG. 7, the low pass filter 702, which corresponds to low pass filter section of alternative embodiments of the line equalizing modules 600-2 and 600-3, represents a phase lag. On the other hand, the high pass filter 704, which corresponds to high pass filter section of alternative embodiments of the line equalizing modules 600-2 and 600-3, represents a phase advance. Therefore, by adjusting the LC parameters it is possible to obtain a suitable phase offset propagation delay for compensating any nulls which are introduced by any possible open-ended stubs within the transmission path.

Figure 8:
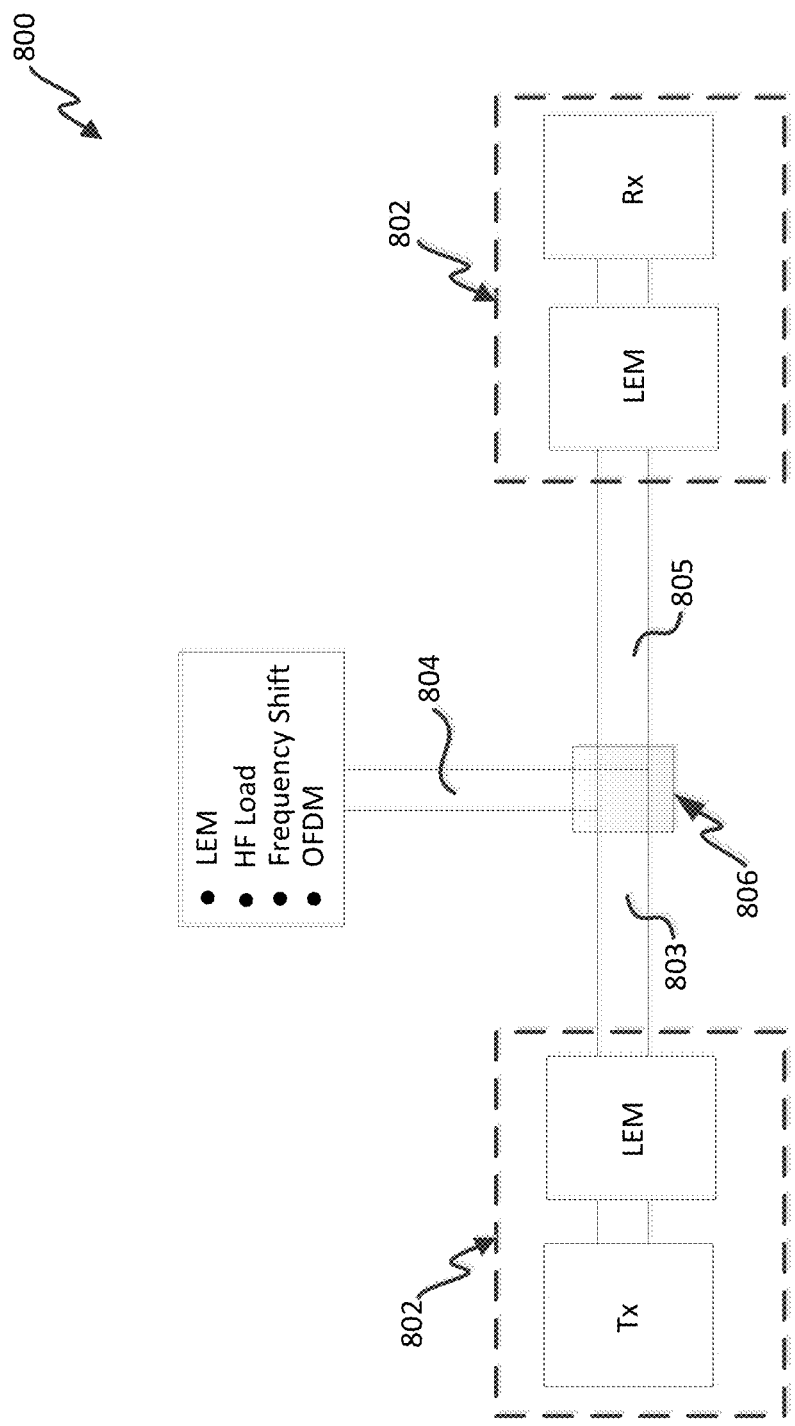
FIG. 8 depicts an exemplary block diagram of a transmission/reception setup configured to implement line equalizing modules.

As will be described further below in various embodiments, the line equalizing module (LEM) may be implemented as an expansion module in one or more of the locations inside a transceiver module or as a stand-alone module which can be connected to any open-ended electrical outlet in a building. FIG. 8 illustrates an exemplary block diagram of a transmission/reception setup 800 configured to implement the line equalizing modules (LEM) according to embodiments of the present invention. As can be seen from this figure, the line equalizing module (LEM) may be integrated within a transceiver device 802, at the transmitter (Tx) side and/or the receiver (Rx) side, or may be plugged into an open-ended electrical outlet 804 as a stand-alone module. It should be noted that, in this example, each transceiver device 802 contains one receiver and one transmitter.

As explained previously herein, the data transmission may be disrupted due to existence of open lines within the transmission path. This is mainly due to the fact that an open transmission line may act as an open stub at certain frequencies which may create severe data degradation and/or substantially slower data rate in a communication system. A reflected signal at an open stub may cancel the incoming signal if certain conditions are met. By way of example, if the electrical length of the open stub is 90 degrees (quarter wavelength), the open stub will appear as a short circuit at certain frequencies. And, if the propagation delay corresponding to twice the open stub length is equal to half of the data rate period (T/2), a perfect null condition is met, which leads to a strong attenuation of data signal. This corresponds to a 180 degrees phase shift of the incoming signal. This phase shift will progressively impact the incoming signal as the phase difference is increased from 0 to 180 degrees).

One solution for open lines or open-ended plugs is to use a high frequency (HF) terminated load that matches the impedance of the transmission line. However, the impedance of the transmission line may vary whenever any appliances may be turned on or turned off or the impedance of the transmission line, itself, may be very hard to control, such as for example electrical lines. Thus, it becomes difficult to terminate the open-ended plug with a HF terminated load that correctly matches the impedance of the transmission line 804. Another solution for an open stub in a residential dwelling is performing a time-domain reflectometry (TDR) test to determine the impedance of the open stub and its distance from the receiver and/or the transmitter. In this case, the system may act as a simple network analyzer that sweeps the entire frequency range of interest in order to determine the transfer function of the transmission path from the transmitter (Tx) to the receiver (Rx).

An alternative solution for open-ended stubs, described further below in detail, is to change the operational frequency by performing an up-conversion or down-conversion operation so as to place the operational frequency within the frequency nulls. Another yet alternative solution may be to use OFDM (Orthogonal frequency-division multiplexing) modulation to encode digital data on multiple carrier frequencies and not use the sub carriers where a deep null is present. The process for implementing the OFDM modulation will be described in detail further below.

A preferred solution, according to the embodiments of the present invention, is the use of line equalizing modules (LEM) to terminate the open stubs 804. In this way, the electrical length of the open stub 804 may vary, depending on the values of each LC components, so as to minimize the imperfection of the transmission line. This allows for matching to the exact impedance of the transmission line while correcting its imperfection in real time. The line equalizing module (LEM) allows for improving the quality of signal if the propagation delay or phase of the transmitted signal can be changed to a value around 0 degrees, 180 degrees, or 360 degrees at operational frequency, thereby, removing the short-circuit seen by the transmission line 804.

Depending on the medium of transmission, different standards may exist to carry data. A power line communication (PLC) network carries data on a conductor that is also used simultaneously for AC electric power transmission or electric power distribution to consumers. It is also known as power line carrier, power line digital subscriber line (PDSL), mains communication, power line telecom (PLT), and broadband over power lines (BPL). Another standard used in home networking is phone-line networking (HomePNA) which carries data over the existing coaxial cables and telephone wiring within homes. In what follows, the implementation of power line communication (PLC) network or phone-line networking (HomePNA) in half-duplex (HDX) mode will be described in detail.

Figure 9:
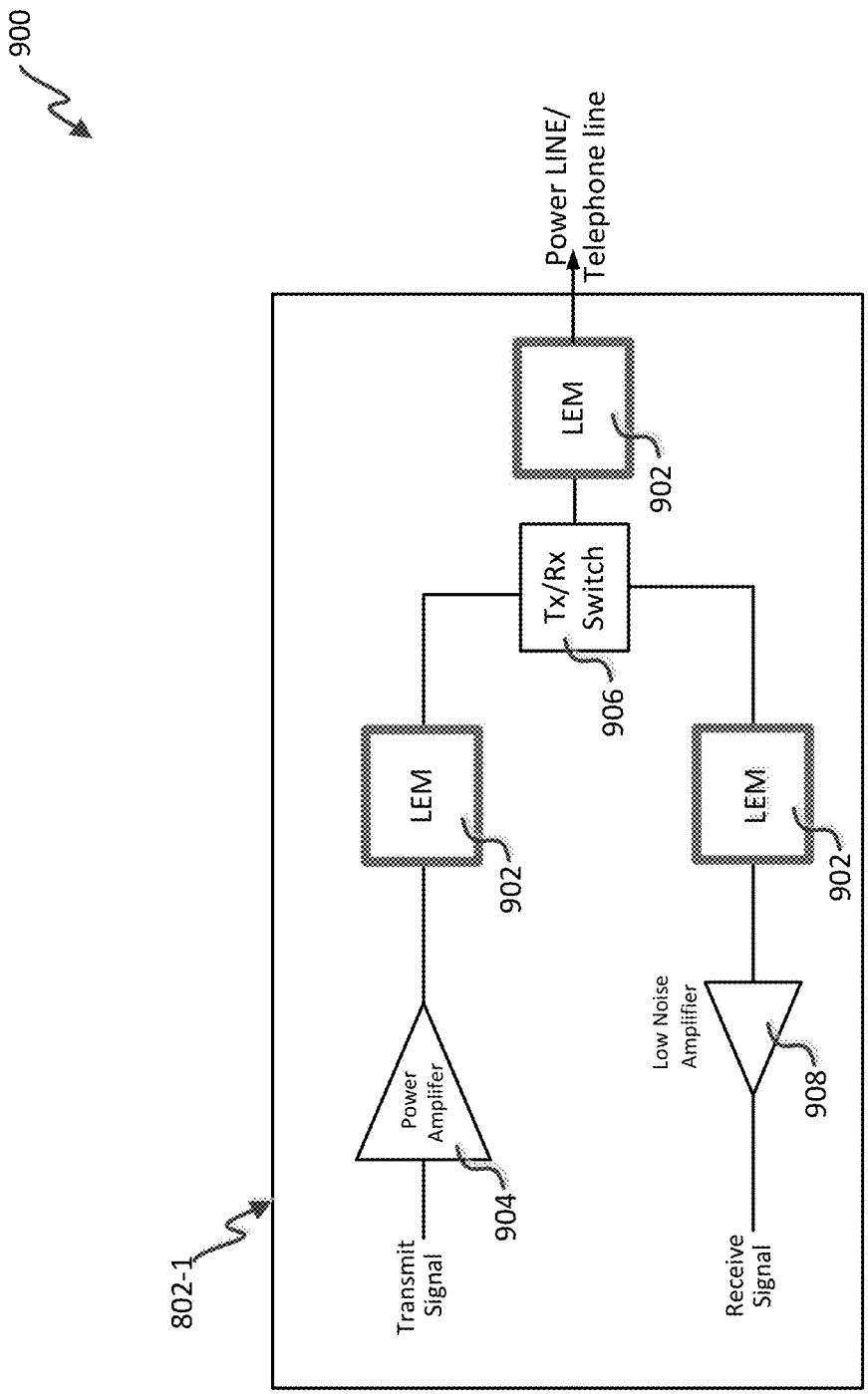
FIG. 9 depicts a block diagram of an embodiment of a transceiver configured to operate in half-duplex mode.

With reference to FIG. 9, a block diagram of an embodiment of a transceiver 802-1 configured to operate in a half-duplex (HDX) mode is shown. A half-duplex (HDX) system provides communication in both directions, but only one direction at a time (not simultaneously). In the transceiver 802-1, three line equalizing modules 902 are implemented: one module in the transmitter path located after power amplifier 904, one module in the receiver path located before low noise amplifier (LNA) 908, and one module located after the transceiver switch 906 and before the input/output port of the transceiver 802-1. It should be noted that the number of line equalizing modules implemented within the transceiver 802-1 is not limited to three, it may be any number larger than or equal to one. In the preferred embodiment, the line equalizing module 902 may be only implemented after the transceiver switch 906 and before the input/output port of the transceiver 802-1. In this embodiment, the line equalizing module 902 may be used as an adjustable impedance matching network, line equalizer (LE), or used as a variable propagation delay, line stretcher (LS).

Figure 10:
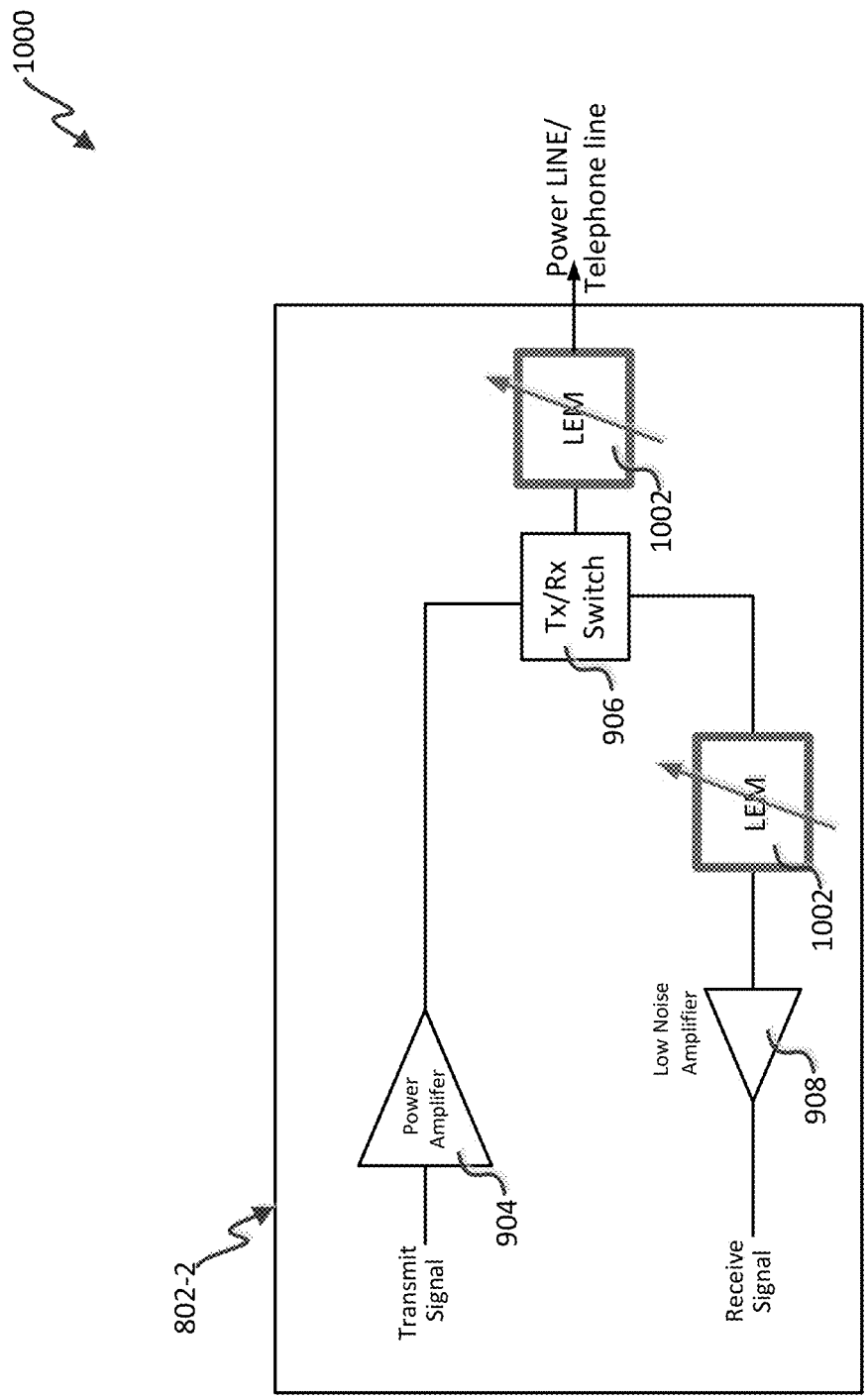
FIG. 10 depicts a block diagram of an alternative embodiment of a transceiver configured to operate in half-duplex mode.

Referring next to FIG. 10, a block diagram of an alternative embodiment of a transceiver 802-2 configured to operate in a half-duplex (HDX) mode is shown. In this embodiment, the line equalizing modules 1002 are made of variable LC component cells, similar to those embodiments described in FIGS. 6B and 6C. This allows for dynamically changing the impedance of the line equalizer (LE) and the propagation delay of the line stretcher (LS) in response to changes in their environment. By way of example, the changes in the environment may occur whenever any appliances are turned on or turned off or whenever a user try to plug or unplug various devices or extension cords into the electrical outlets of the building. As shown in FIG. 10, two variable line equalizing modules 1002 are implemented within the transceiver 802-2: one in the receiver path before the LNA amplifier 908 and one at the input/output port of the transceiver 802-2.

Figure 11:
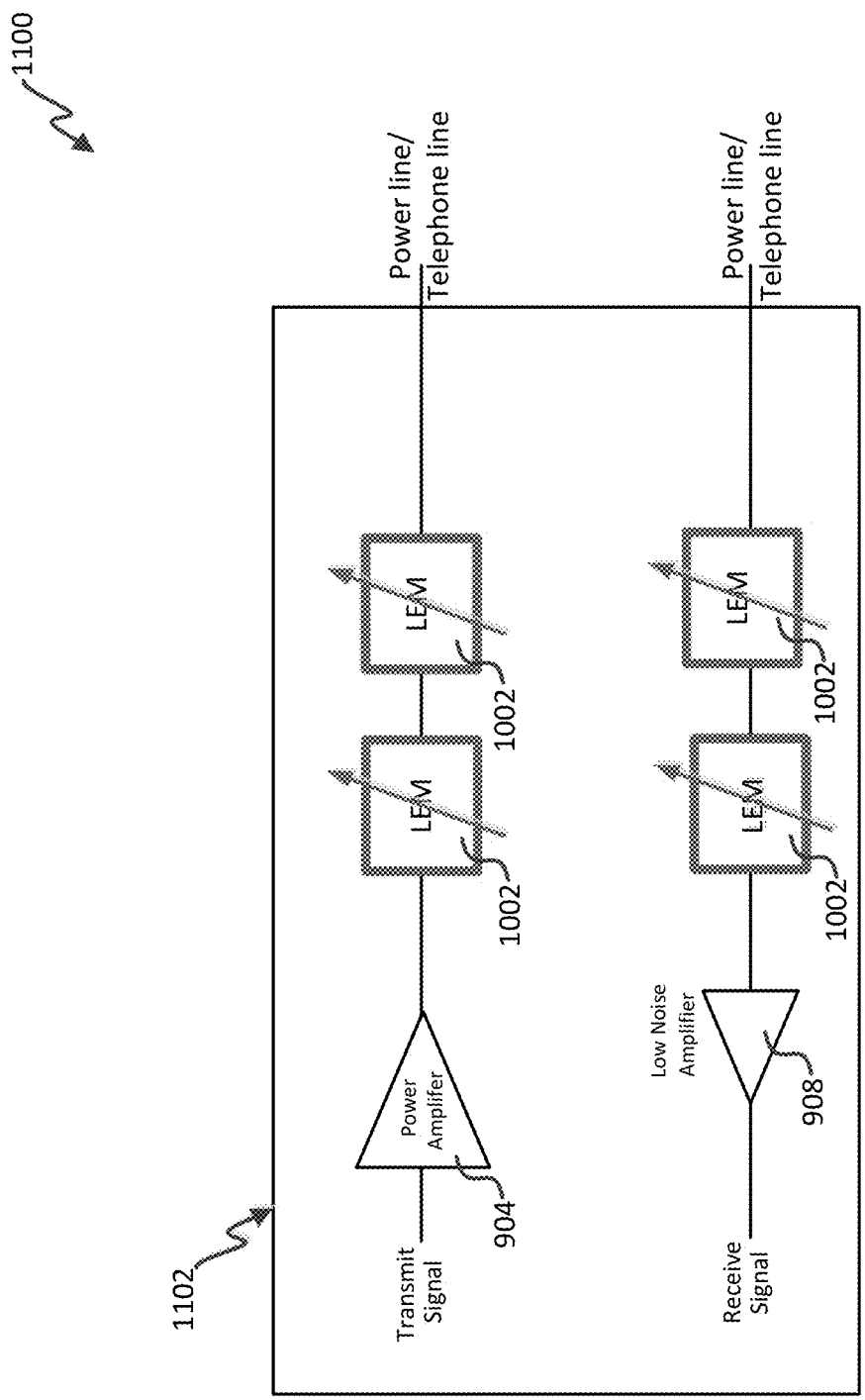
FIG. 11 depicts a block diagram of an embodiment of a transceiver configured to operate in full-duplex (FDX) mode.

Referring now to FIG. 11, a block diagram of another embodiment of a transceiver 1102 configured to operate in a full-duplex (FDX) mode is shown. In this embodiment, two variable line equalizing modules 1002 are used on each of the transmitter and receiver sides, allowing for simultaneous adjustment of the phase or the propagation delay and matching the impedance of the communication device to the average impedance of the transmission line. As known to one of ordinary skill in the art, the power line communication (PLC) network or phone-line networking (HomePNA) may also be implemented in full-duplex (FDX) mode in which two connected parties or devices can communicate with one another in both directions, simultaneously, allowing a higher data rate to be achieved. This is mainly due to the fact that a collision-free environment is created.

In this way, the transmission and the reception of packets may be performed on separate power lines, i.e., one on the phase line and the other one on a separate neutral line. Some embodiments may use twisted pair communication cables where the transmission and the reception of packets may be performed on separate twisted pair cables. Other embodiments may use the same twisted pair cable where the transmission and the reception of packets may be performed on each of the two conductors. The full-duplex (FDX) mode may also be implemented on one single conductor with a full-duplex control circuit where the transmitter (Tx) and the receiver (Rx) may be connected through a combiner (not shown in the figure).

Figure 12:
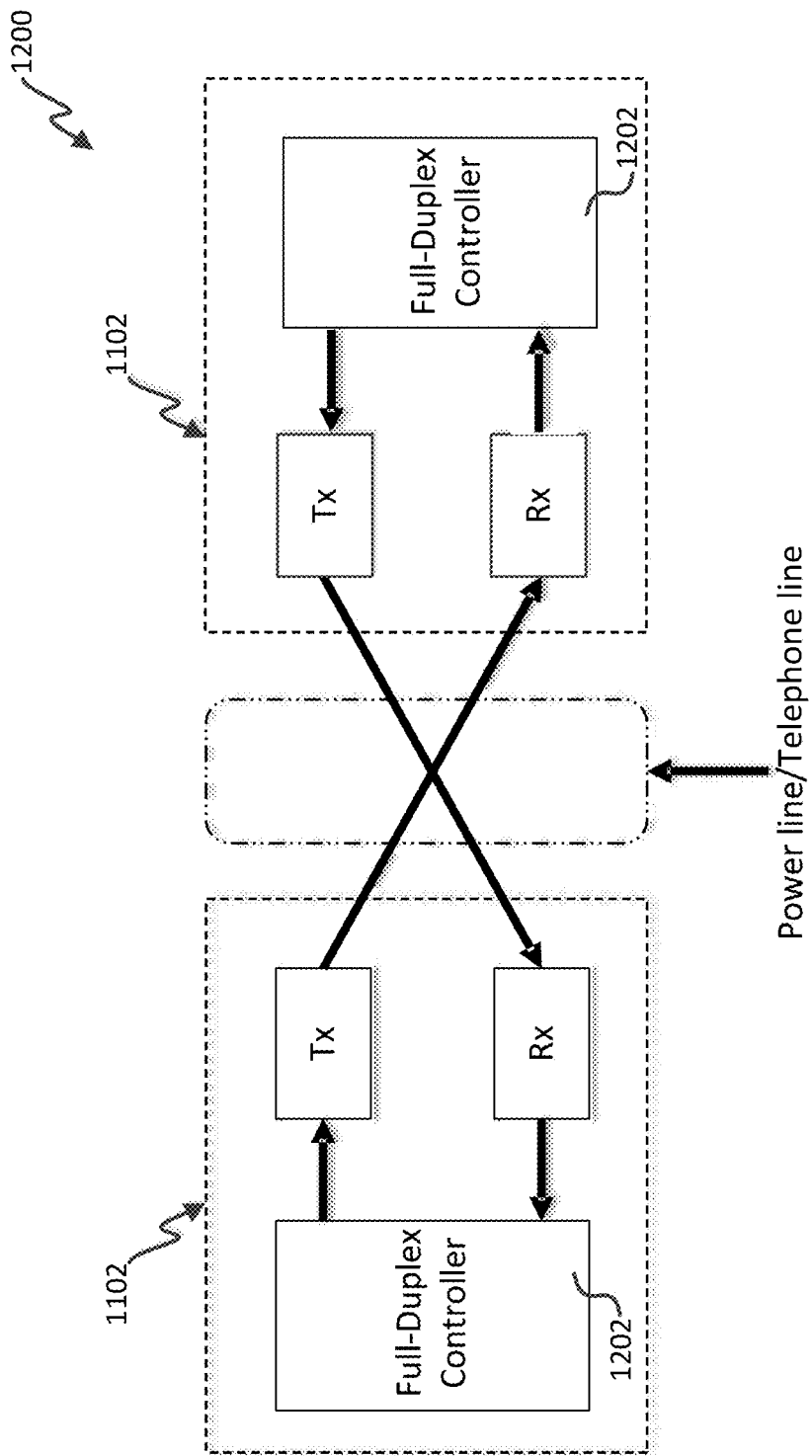
FIG. 12 depicts a block diagram of an embodiment of a communication network system implemented in full-Duplex (FDX) mode.
Figure 13:
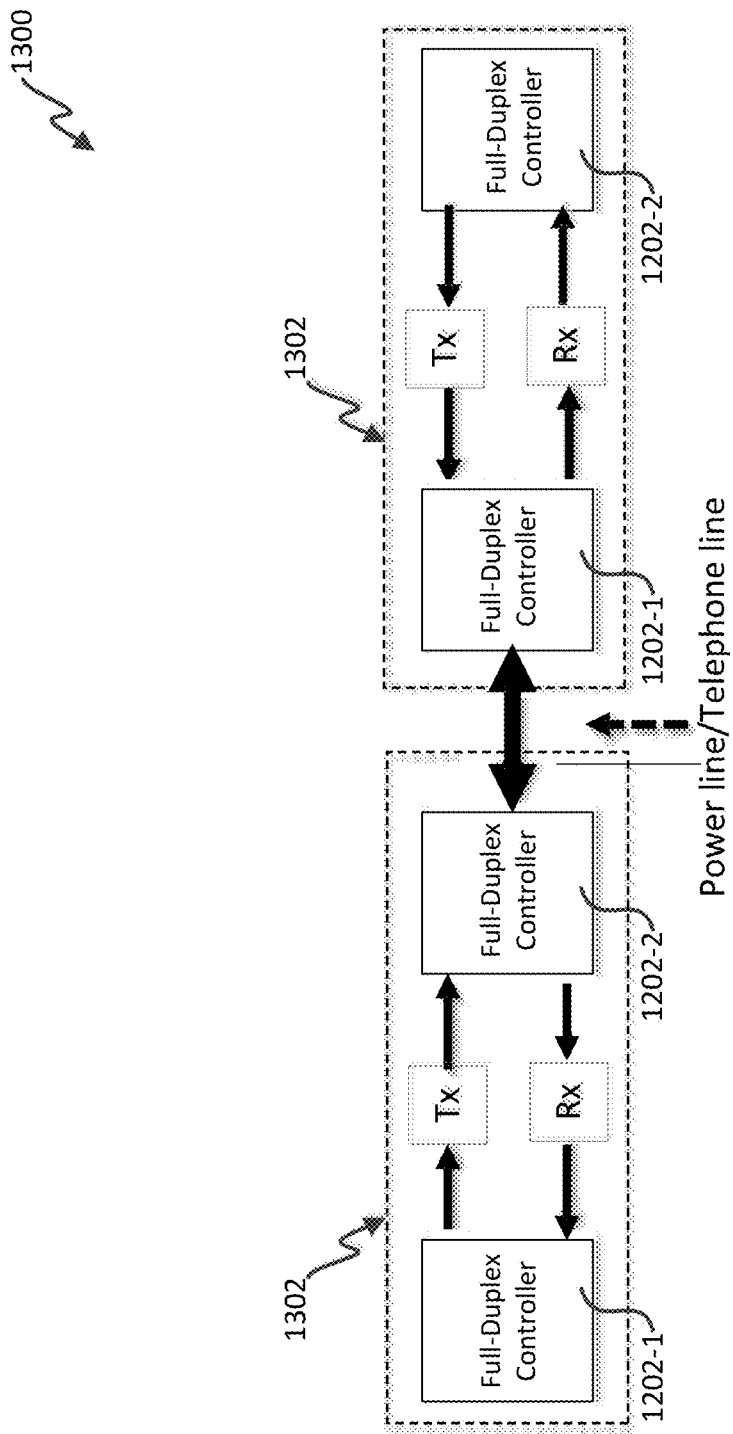
FIG. 13 depicts a block diagram of an alternative embodiment of a communication network system implemented in full-Duplex (FDX) mode.

FIG. 12 depicts a block diagram of an embodiment of a communication network system 1200 implemented in full-Duplex (FDX) mode. In this embodiment two separate lines of communications are used for transmitting and receiving data packets, allowing data communication between two separate devices 1102 at the same time with the same frequency. A block diagram of an alternative embodiment of a communication network system 1300 implemented in full-Duplex (FDX) mode is shown in FIG. 13. In this alternative embodiment, only one line of communication is used between two communication devices 1302. In order to separate data packets coming from the transmitter (Tx) and the receiver (Rx), a second full-Duplex (FDX) controller 1202 may be added into each transceiver devices 1302. This structure allows data communication over one line of communication using two different frequency carriers.

In order to evaluate the effect of equalizing a line of communication, various simulations incorporating different embodiments of line equalizing modules (LEM) are performed. The equalization of the communication line is performed by either pushing out electrically any nulls or imperfection within the frequency range of interest or by matching the impedance of the communication device to the average impedance of the transmission lines. For the purpose of evaluation, the simulation results are compared with the results of a lossless and an open stub transmission lines.

It should be noted that the transmission lines simulated herein may be any type of transmission lines, such as for example, coaxial lines, power line cables, or twisted pair cables, etc. In the following, the results of these simulations will be explained in detail.

Figure 14:
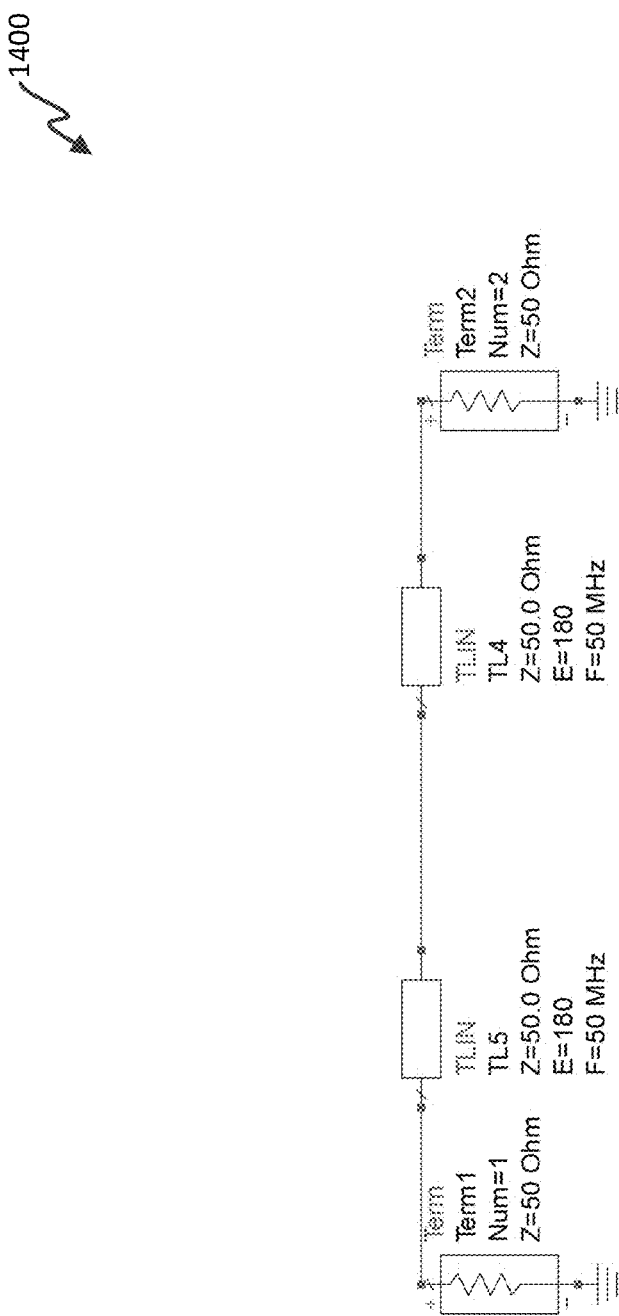
FIG. 14 illustrates a circuit diagram of an ideal lossless transmission line.
Figure 15:
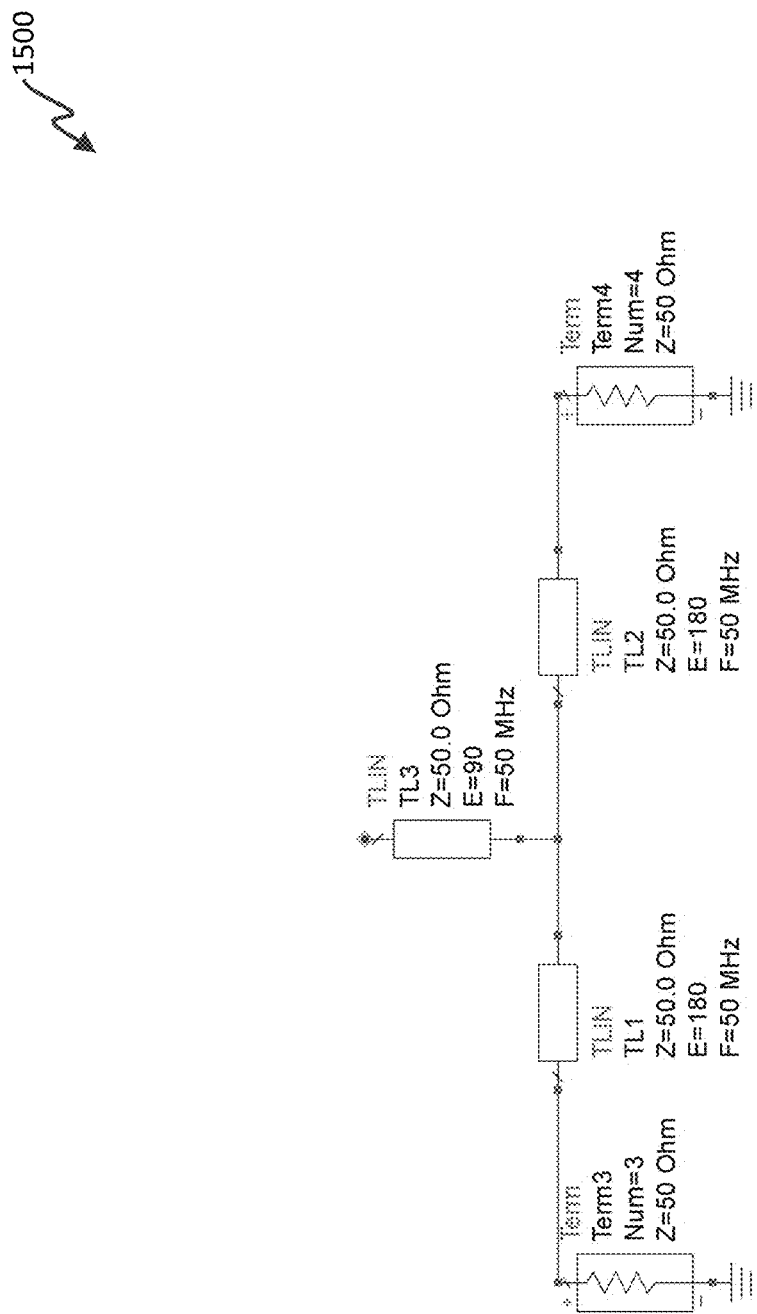
FIG. 15 illustrates a circuit diagram of a transmission line with an open stub.

Referring next to FIG. 14, a circuit diagram 1400 in simulation software for an ideal lossless transmission line is shown. As shown in this figure, the ideal lossless transmission line has a characteristic impedance of 50 Ohm with an electrical length of 180 degrees at operational frequency of 50 MHz. The transmission line is further coupled to a source and a load, each having substantially the same characteristic impedance as the impedance of the transmission line ($Z_0$=50 Ohm). FIG. 15 illustrates a circuit diagram 1500 for a transmission line having an open-ended stub with a 90 degrees electrical length (quarter wavelength), which creates a frequency null at 50 MHz.

Figure 16:
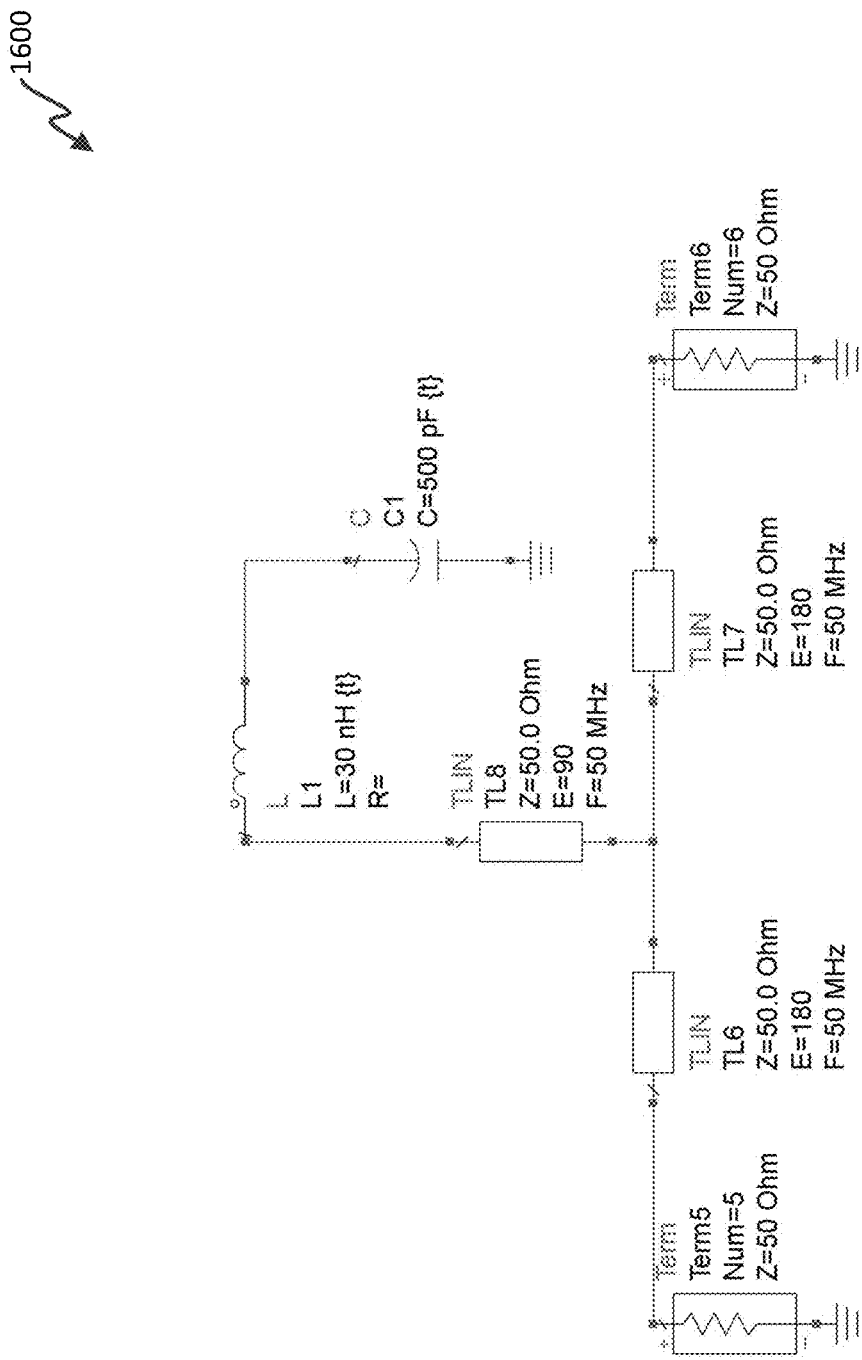
FIG. 16 illustrates a circuit diagram of an exemplary line equalizing module (LEM) when the open stub of transmission line is accessible.
Figure 17:
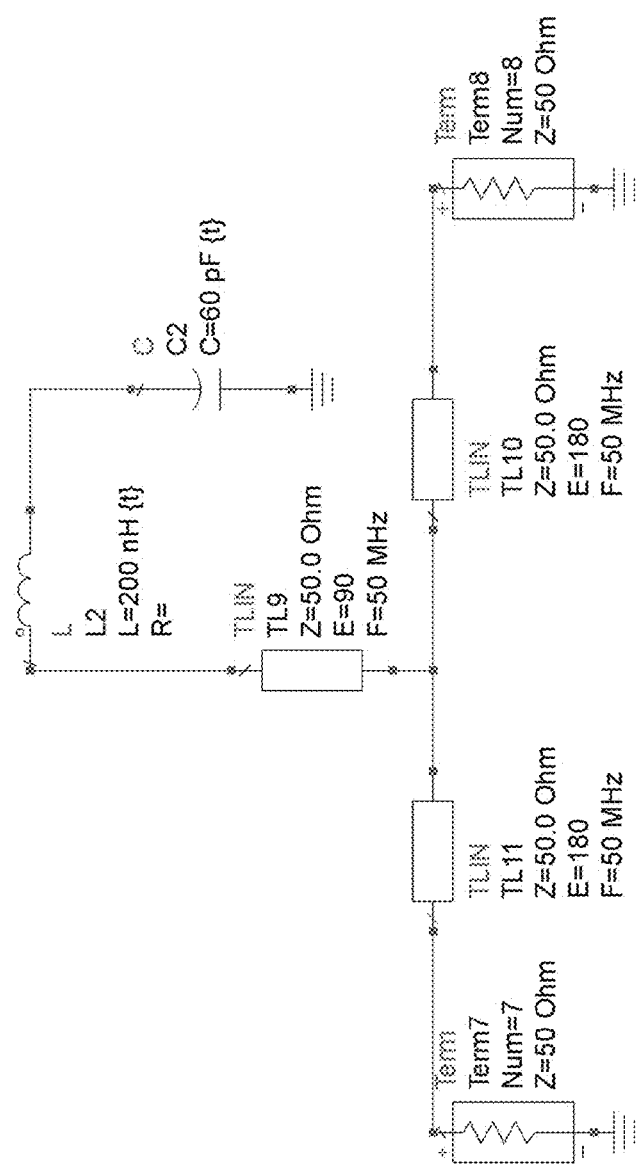
FIG. 17 illustrates a circuit diagram of another exemplary line equalizing module (LEM) when the open stub of transmission line is accessible.

When the open stub is accessible to the end user, a line equalizing module (LEM), according to the embodiments of the present invention, may be incorporated in shunt at the open-ended stub of the transmission line. FIG. 16 illustrates an exemplary embodiment of a line equalizing module (LEM). In this embodiment, the line equalizing module may include an inductance of 30 nH for the series inductor $L_1$ and a capacitance of 500 pF for the shunt capacitor $C_1$. FIG. 17 illustrates another exemplary embodiment of the line equalizing module (LEM) incorporated in shunt at the open-ended stub of the transmission line. The line equalizing module of FIG. 17 has the same structure as the one shown in FIG. 16 but represent different inductance and capacitance values ($L_1$=200 nH and $C_1$=60 pF).

Figure 18:
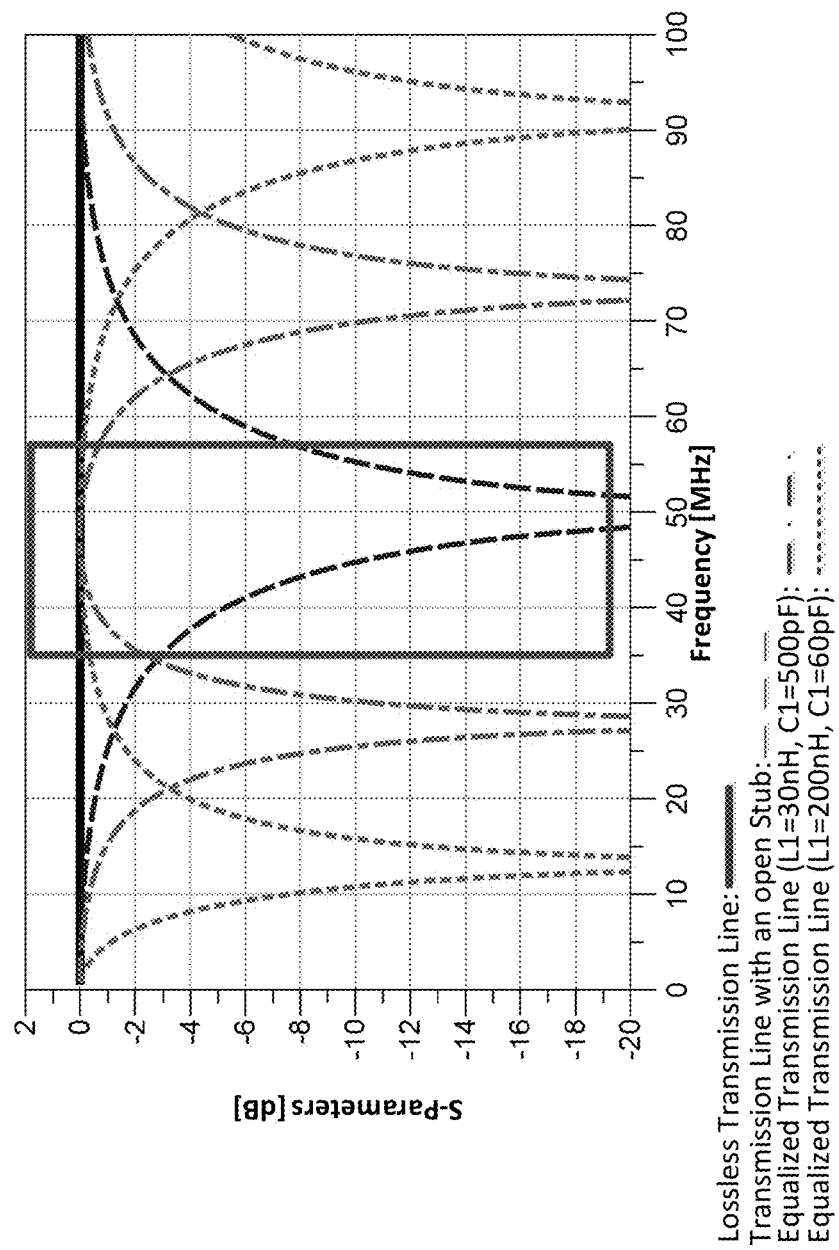
FIG. 18 illustrates S-parameters as a function of frequency for all circuit diagrams shown in FIGS. 14-17.

With reference to FIG. 18, the frequency responses (S-parameters) of all circuit diagrams, shown in FIGS. 14-17, are shown. In this figure, the rectangle shows the frequency band of interest which is within a range of about 35 MHz to about 58 MHz. As shown in FIG. 18, the solid bold line illustrates the frequency response of the ideal lossless transmission line where a flat response with unlimited bandwidth and no loss is shown. The broken line graph represents the frequency response of the transmission line with the open-ended stub. As can be seen from FIG. 18, the frequency response of the transmission line with the open-ended stub represents a frequency null at 50 MHz. In order to improve the quality of signal or to equalize the transmission line, a line equalizing module is incorporated in shunt at the open-ended stub of the transmission line. The dotted-broken line graph represents the frequency response of the corrected transmission line where the line equalizing module of FIG. 16 ($L_1$=30 nH and $C_1$=500 pF) is incorporated at its open-ended stub. Accordingly, the dotted line graph represents the frequency response of the corrected transmission line where the line equalizing module of FIG. 17 ($L_2$=200 nH and $C_2$=60 pF) is incorporated at its open-ended stub.

As shown in FIG. 18, the frequency null at 50 MHz, which is created due to the existence of open-ended stub, is electrically pushed out from the frequency band of interest allowing data communication within said frequency range. It should be noted that for each of the corrected transmission lines, two frequency nulls exist in their frequency response. By way of example, the first line equalizing module (FIG. 16: $L_1$=30 nH and $C_1$=500 pF) has one frequency null at about 28 MHz and another frequency null at about 73 MHZ. In addition, the frequency response of the first line equalizing module shows some losses within the frequency range of transmission. By optimizing the inductance and capacitance values ($L_1$=200 nH and $C_1$=60 pF) of the line equalizing module a substantially lossless transmission can be achieved over a wider range which includes entirely the frequency band of interest. As can be seen from FIG. 18, the frequency response of the optimized line equalizing module (FIG. 17: $L_2$=200 nH and $C_2$=500 pF) shows one frequency null at about 13 MHz and another frequency null at about 92 MHZ.

In what follows the effect of equalizing a line of communication when the open stub is not accessible to the end user is considered. For this purpose, the line equalizing module (LEM) may be incorporated in series into the transmission path on the transmitter side and/or the receiver side of the system. It should be noted that the same circuit diagram as the one shown in FIG. 15 is used for simulating the transmission line with an open stub. Thus, similar to the previous simulation results, the open-ended stub has an electrical length of 90° (quarter wavelength) that creates a frequency null at 50 MHz.

Figure 19:
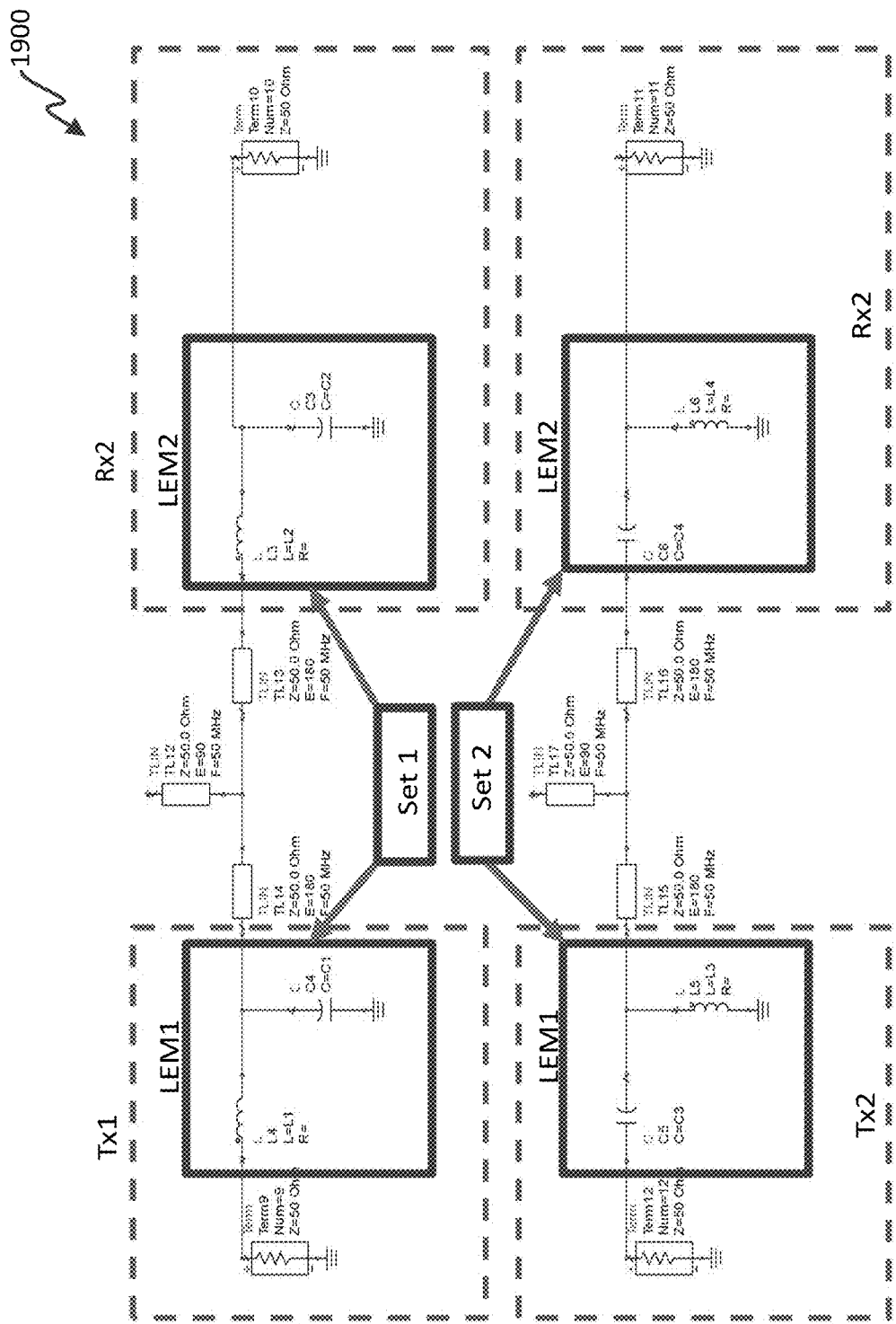
FIG. 19 illustrates circuit diagrams of two exemplary set of line equalizing modules (LEM) when the open stub of the transmission line is not accessible.

FIG. 19 illustrates circuit diagrams of two exemplary sets of line equalizing modules (LEM). As explained above, when the open-ended stub of the transmission line is not accessible to the end user, two line equalizing modules (LEM) are incorporated in series within the transmission line. As shown in FIG. 19, in each set, a first line equalizing module (LEM) is incorporated between the source and the input port of the transmission line while a second line equalizing module is incorporated between the output port of the transmission line and the load. In the first set, the inductance and capacitance values of the first and second line equalizing modules are respectively set as follows: $L_1$=5 nH, $C_1$=150 pF, $L_2$=1 nH, and $C_2$=150 pF. In the second set the following inductance and capacitance values are used respectively in the first and second line equalizing modules: $L_1$=74 nH, $C_1$=750 pF, $L_2$=107 nH, and $C_2$=240 pF. It should be understood that the above-mentioned values are given for the exemplary purposes and they are not intended to be exhaustive.

Figure 20:
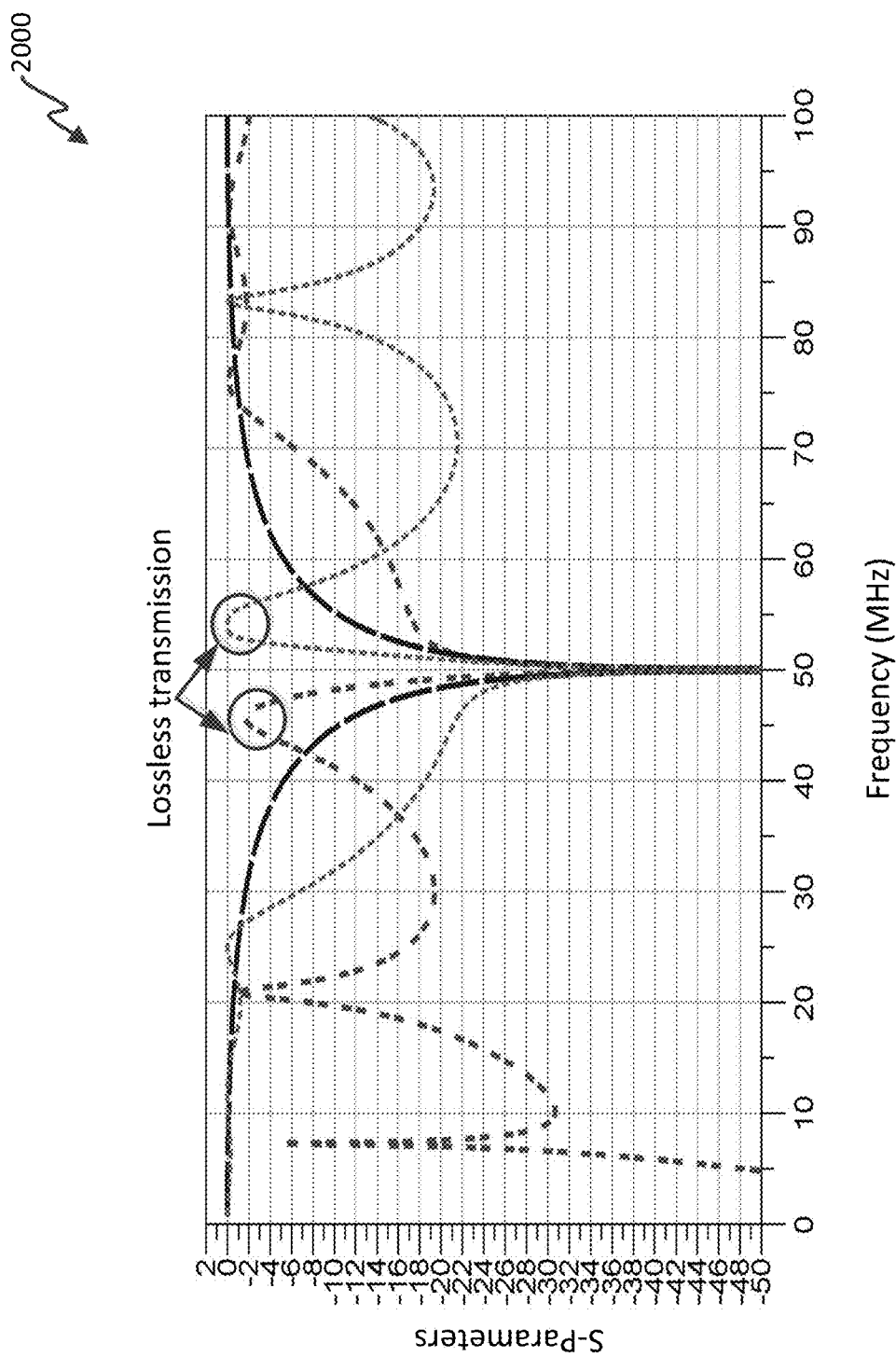
FIG. 20 illustrates S-parameters as a function of frequency for both set of circuit diagrams shown in FIG. 19.

Referring next to FIG. 20, the frequency response (S-parameters) of both set of circuit diagrams (FIG. 19) is shown. For the sake of convenience, the frequency response of the transmission line with the open-ended stub that represents a frequency null at 50 MHz is also shown in this figure (broken line graph). As shown in FIG. 20, the line equalizing module can compensate for the losses that are introduced by the open stub. The dotted line graph represent the frequency response when the first set of line equalizing modules ($L_1$=5 nH, $C_1$=150 pF, $L_2$=1 nH, and $C_2$=150 pF) are incorporated within the transmission line. The frequency response for the second set of line equalizing modules ($L_1$=74 nH, $C_1$=750 pF, $L_2$=107 nH, and $C_2$=240 pF) is presented by dashed line. As can be seen from this figure, the frequency response of the first set of line equalizing module is substantially lossless at about 54 MHz. The frequency response of the second set of line equalizing module shows a loss of about −2 dB at about 48 MHz. This is mainly achieved by matching the impedances of the communication devices, i.e., source and load, to the average impedance of the transmission line. According to the simulation results, the first set of line equalizing modules offers a better impedance match.

Figure 21:
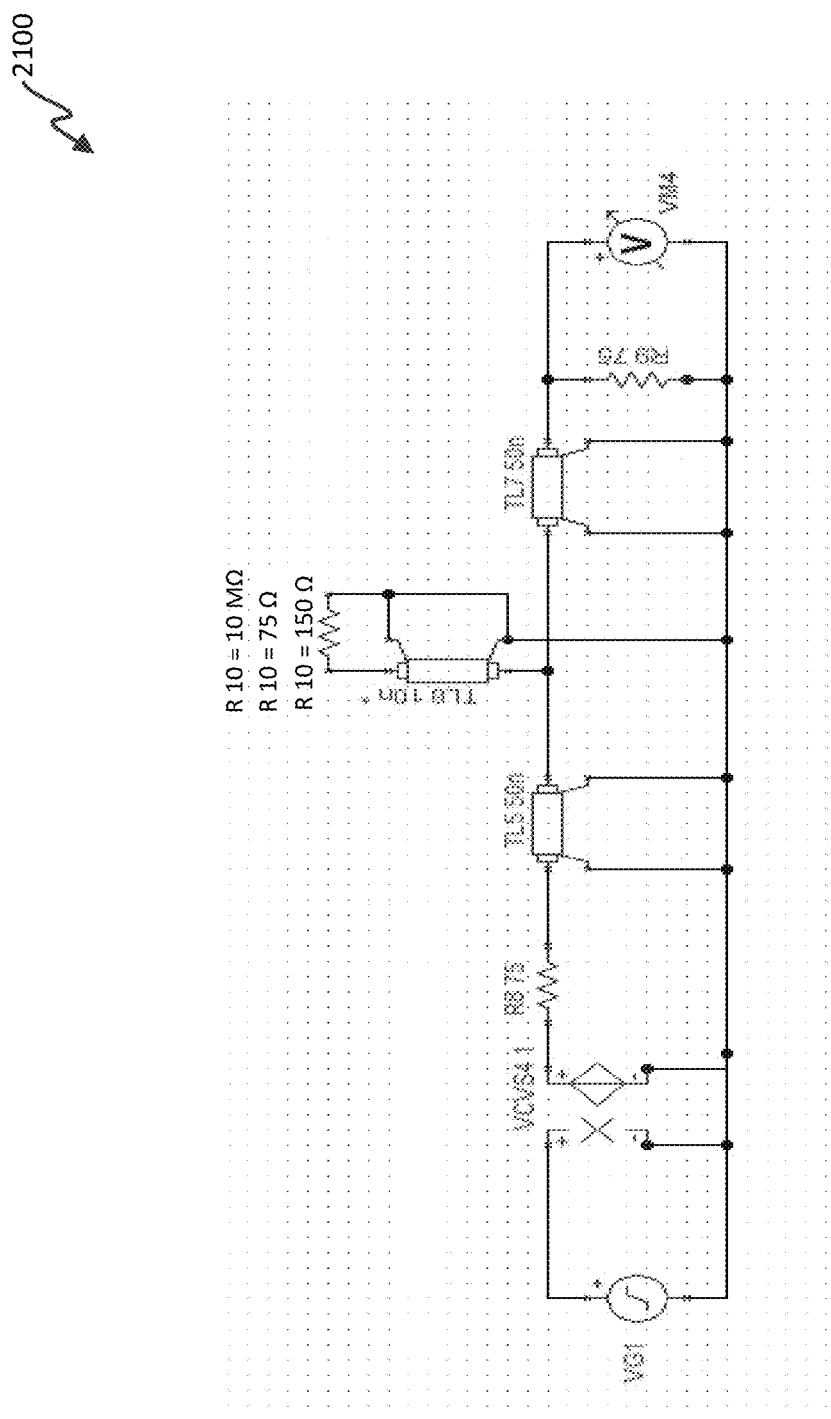
FIG. 21 illustrates an exemplary schematic diagram of a transmission line with an open stub terminated with a variable delay line connected in parallel to a resistive load.

With reference to FIG. 21, a schematic diagram of a transmission line with an open stub which is terminated with a variable delay line and a resistive load is shown. The variable delay line adjusts from 0 to 10 ns in steps of 1 ns. This allows for varying electrically the length of open stub versus the data rate which is sent from the transmitter (VG1) to the receiver (VM1). Three values of resistive load are used in this simulation: $R_{10}$=10 MΩ, $R_{10}$=75Ω, and $R_{10}$=150Ω. For $R_{10}$=10 MΩ, which is equivalent to terminating the open stub with only the variable delay line, the simulation results showed that the signal integrity of the transmitted signal is greatly affected. The worst case signal integrity for this embodiment is achieved when the delay line is equal to 180 degrees in phase shift where almost the output signal is totally cancelled. When the open stub is terminated with a resistive load of 75Ω in conjunction with the variable delay, the signal integrity of the transmitted signal is unaffected when the electrical length of the stub changes. However, an attenuation of signal is observed due to the existence of an impedance mismatch at the open stub junction. In a case where the open stub is terminated with a resistive load of 150Ω, the signal integrity of the transmitted signal is somewhat affected in addition to signal attenuation due to existence of an impedance mismatch at the end on open stub. Please note that the above-mentioned simulation results are only partially disclosed in the following paragraph.

Figure 22:
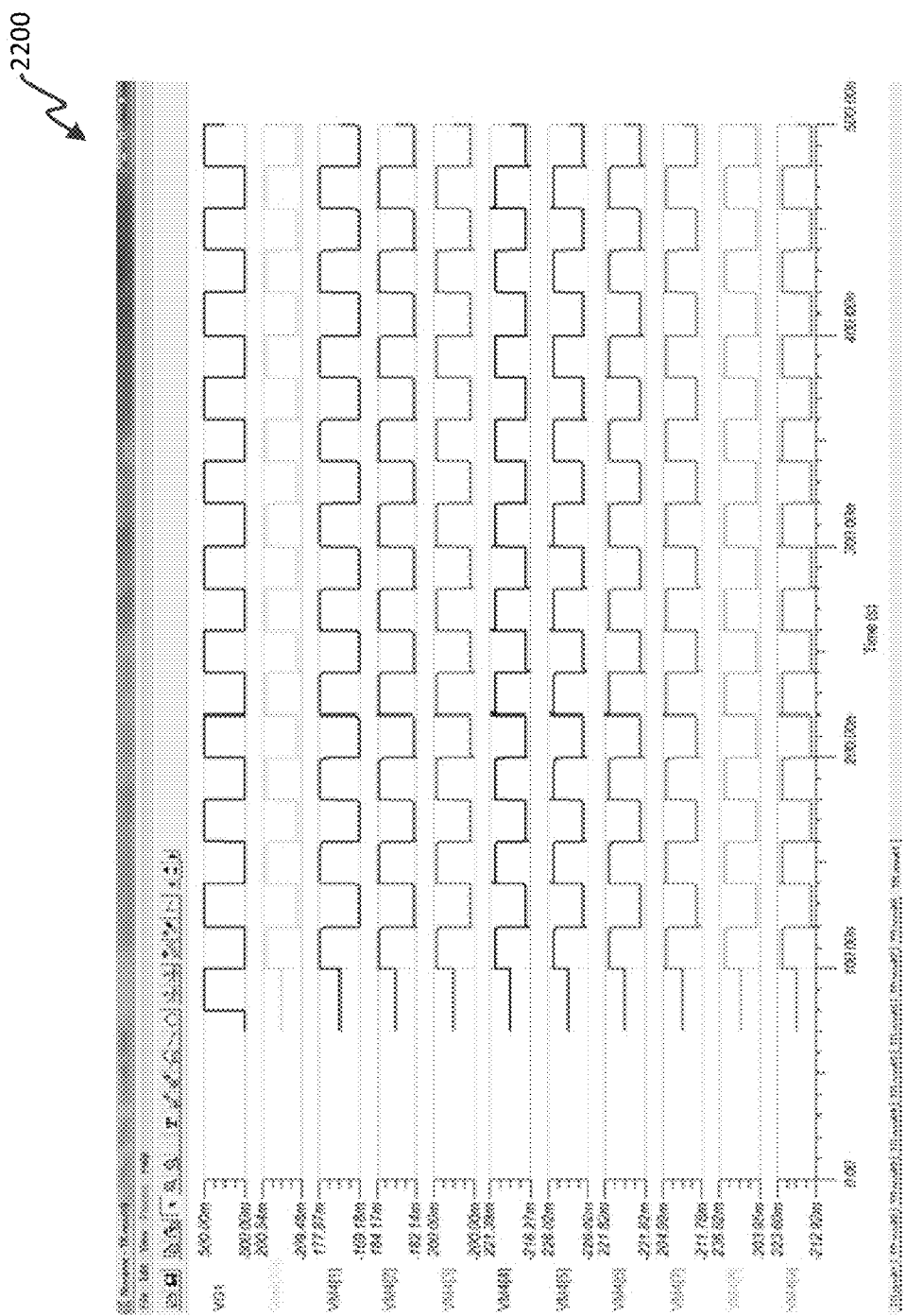
FIG. 22 illustrates input and output transient signals for various length of an open stub terminated with a variable delay line and 75 Ohm resistive load.
Figure 23:
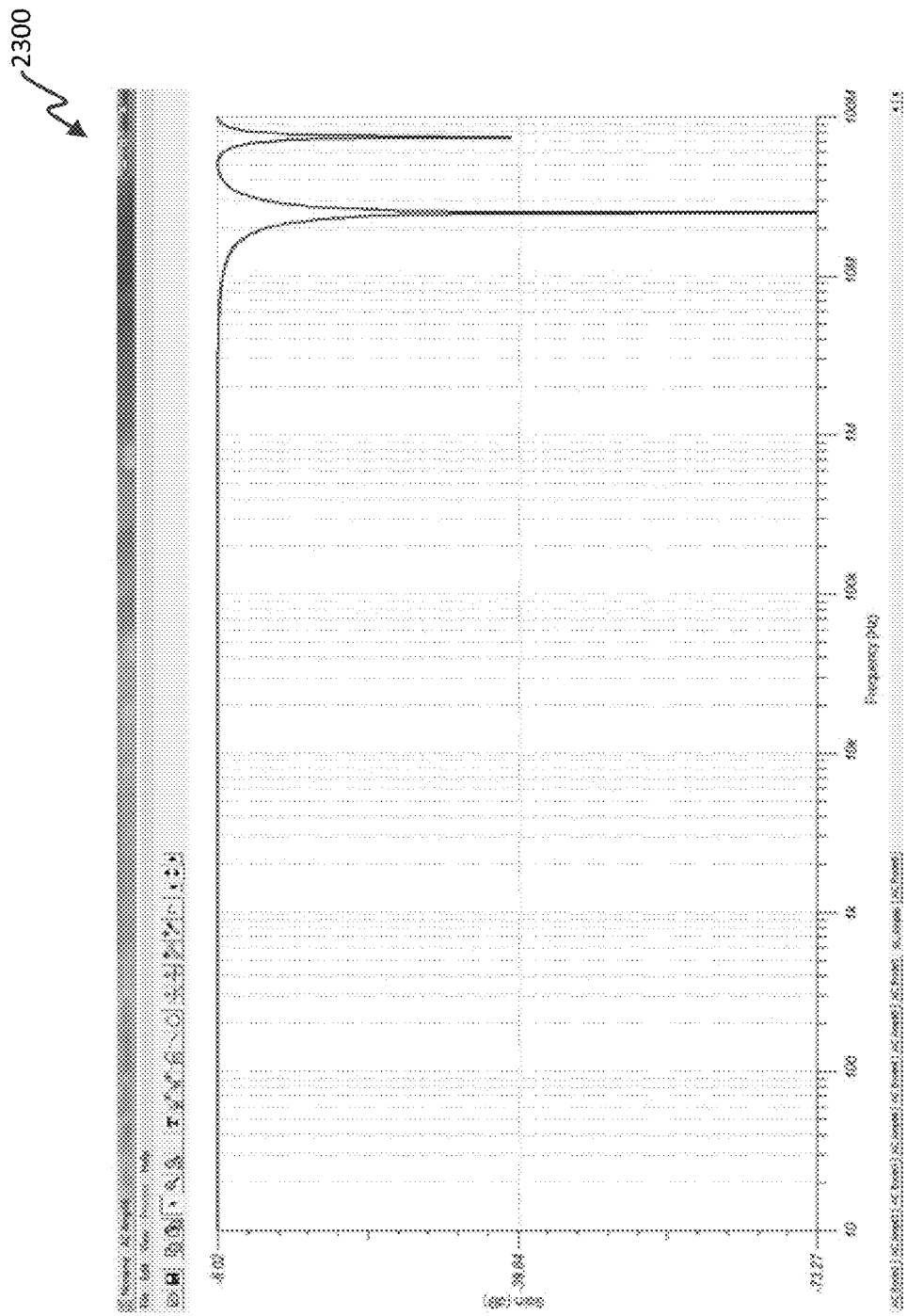
FIG. 23 illustrates S-parameters as a function of frequency for the schematic diagram shown in FIG. 21.

FIG. 22 illustrates input and output transient signals for various length of an open stub terminated with a variable delay line and a resistive load of 75 Ohm. As explained above and also shown in FIG. 22, the signal integrity of the transmitted signal is not affected when the electrical length of the open stub changes, however, a loss of 2.8 dB (about 360 mVpp vs. 500 mVpp) is observed for all the variable delays due to the mismatch impedance. It should be noted that the 75 Ohm resistive load provides the best results in terms of signal integrity and attenuation. This is mainly due to the fact that it produces the best impedance match at the open stub junction of the transmission line. FIG. 23 illustrates the frequency response of the embodiment shown in FIG. 21. As shown in this figure, the transmission line is characterized by a bandwidth of about 20 MHz when a resistive load 10 MΩ is used.

To further evaluate different embodiments of the line equalizing modules and their effect on improving the signal and equalization of communication line, an alternative embodiment, in which the open stub of the transmission line is terminated with a constant delay line connected in parallel with a variable inductor and a variable capacitor, is simulated.

Figure 24:
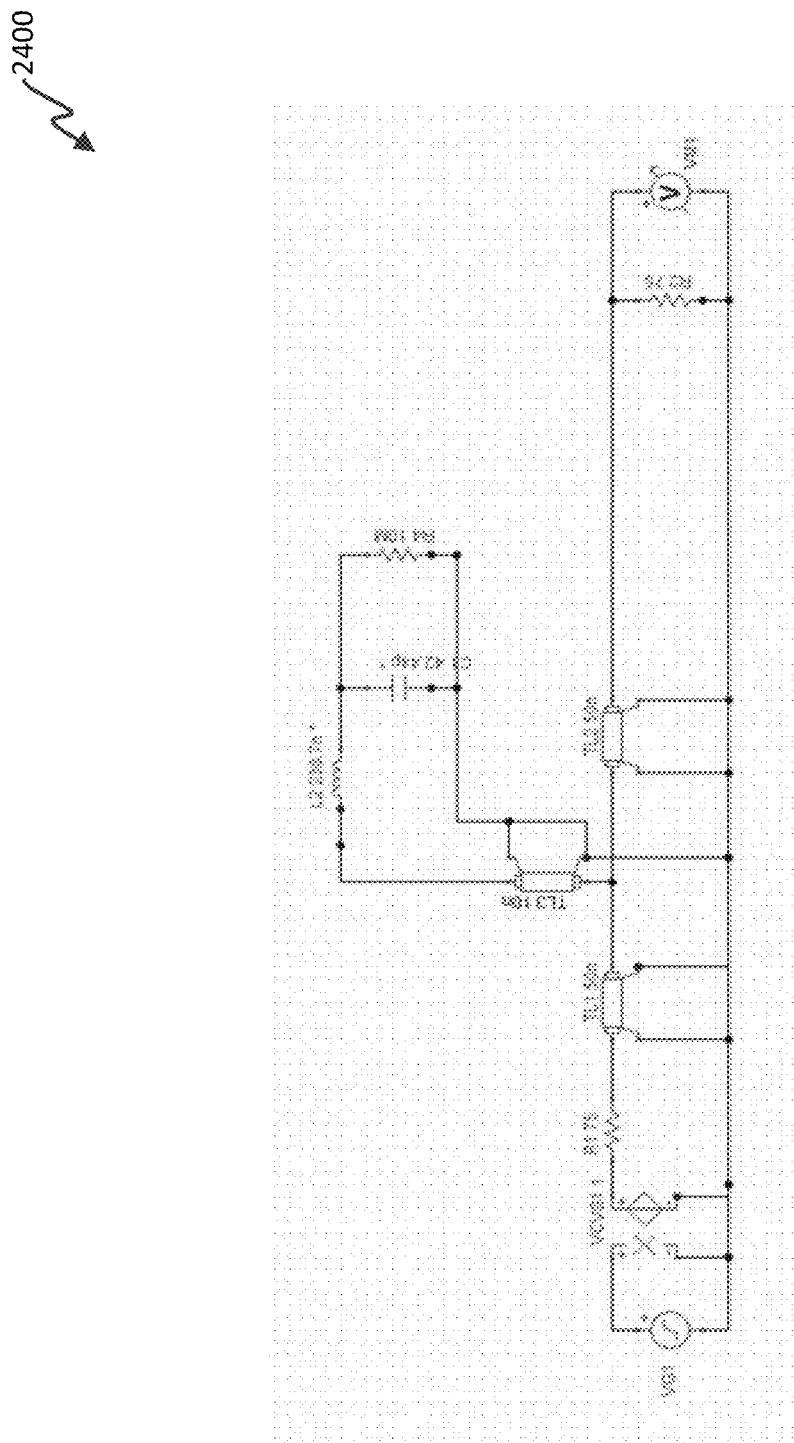
FIG. 24 illustrates an exemplary schematic diagram of a transmission line with an open stub terminated with a constant delay line connected in parallel to a variable inductor and a variable capacitor.
Figure 25:
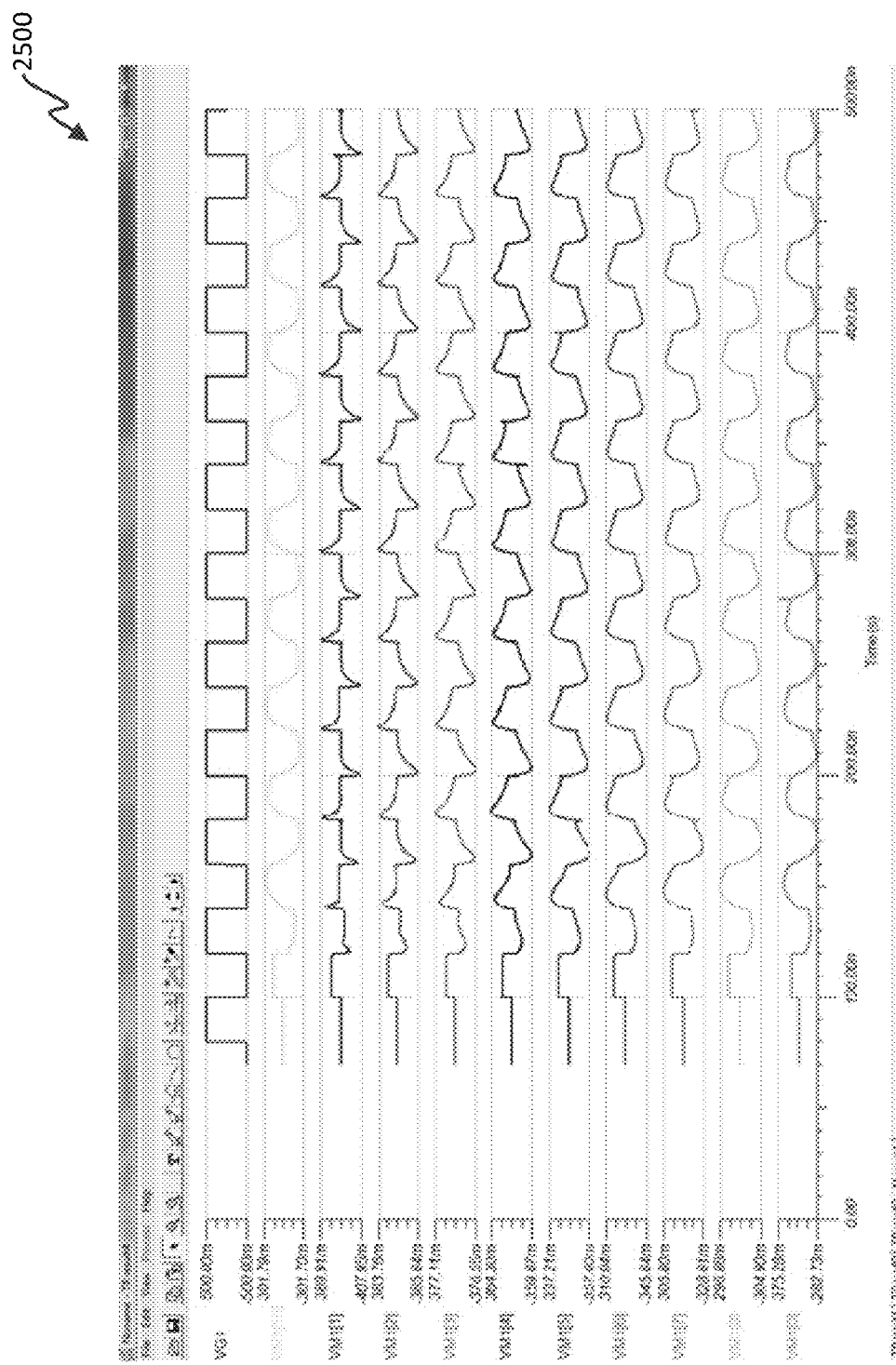
FIG. 25 illustrates input and output transient signals as a function of different delays for the schematic diagram shown in FIG. 24.

Referring now to FIG. 24, an exemplary schematic diagram of a transmission line with an open-ended stub is shown. In this embodiment, the open-ended stub of the transmission line is terminated with a constant delay line (i.e., 10 ns) connected in parallel to a variable inductance $L_2$ and a variable capacitance $C_1$. The variable inductance $L_2$ ranges from 130 to 1300 nH while the variable capacitance $C_1$ ranges from 13 to 133 pF. FIG. 25 illustrates input and output transient signals as a function of different delays for the schematic diagram shown in FIG. 24. As shown in this figure, various amounts of delays are obtained by changing the values of variable inductor $L_2$ and variable capacitor $C_1$. The total delay, which is two times the sum of the constant delay line (10 ns) and the delay introduced by varying the inductance and capacitance values, adjusts in steps of 1 ns. This leads to a minimum delay of 22 ns and a maximum delay of 40 ns.

Figure 26:
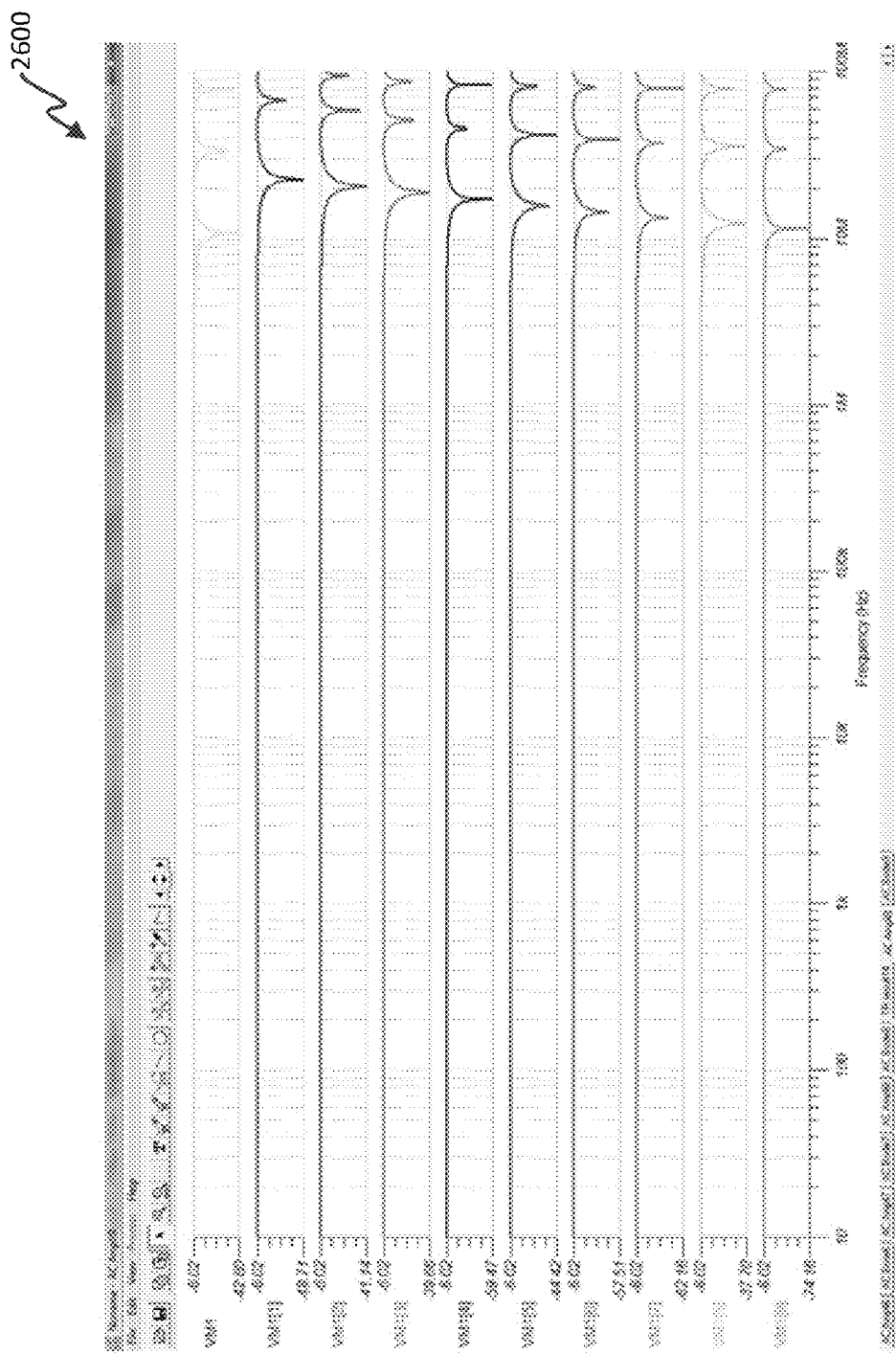
FIG. 26 illustrates the frequency response as a function of different delays for the schematic diagram shown in FIG. 24.

The simulation results show that, except for the progressive bandwidth limitation and low pass filtering effect, using the line equalizing module in an open stub transmission line allows for stretching electrically the open-ended stub so that its effect is canceled within the communication line. The transient signal when the total delay is minimum (22 ns) is shown by the curve VM1(1) where the signal integrity is greatly affected. Accordingly, by increasing the delay, the effect of open-ended stub on the communication line is reduced. The transient signal for a total delay of 40 ns is shown by the curve VM1(10) where the signal integrity is substantially restored by electrically stretching the length of open-ended stub. FIG. 26 illustrates the frequency response as a function of different delays for the schematic diagram shown in FIG. 24. As shown in this figure, the frequency null, created at about 10 MHz, is pushed out from the data rate bandwidth.

Figure 27:
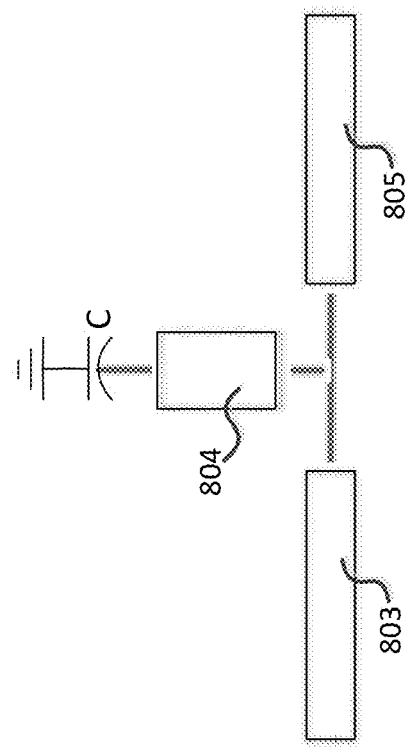
FIG. 27 illustrates an alternative embodiment for terminating an open-ended transmission line.

Referring next to FIG. 27, an alternative embodiment of a line equalizing module for terminating an open-ended stub 804 of a transmission line is shown. In this alternative embodiment, the open-ended stub 804 of the transmission line is coupled to the ground via a termination capacitor C. The actual capacitance value assumed by the capacitor depends on the frequency of operation, as the impedance characteristic of the capacitor is inversely proportional to frequency. By way of example, for an operating frequency of about 50 MHz, a capacitance value of about 500 pF may be preferably used. It should be noted that higher frequency range requires smaller capacitance values. A null at 50 MHz can be moved to around 13 MHz in this case.

Figure 28A:
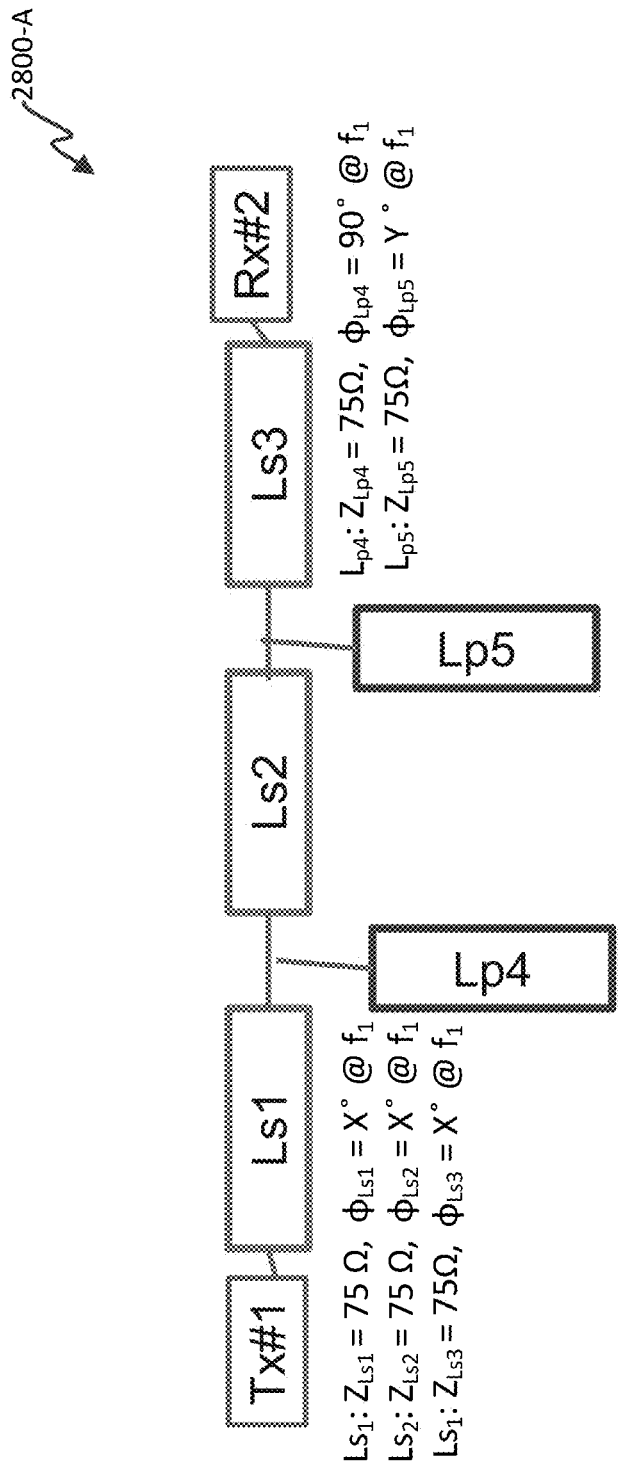
FIGS. 28A and 28B illustrate, respectively, a schematic diagram of a power line system and its frequency response.
Figure 28B:
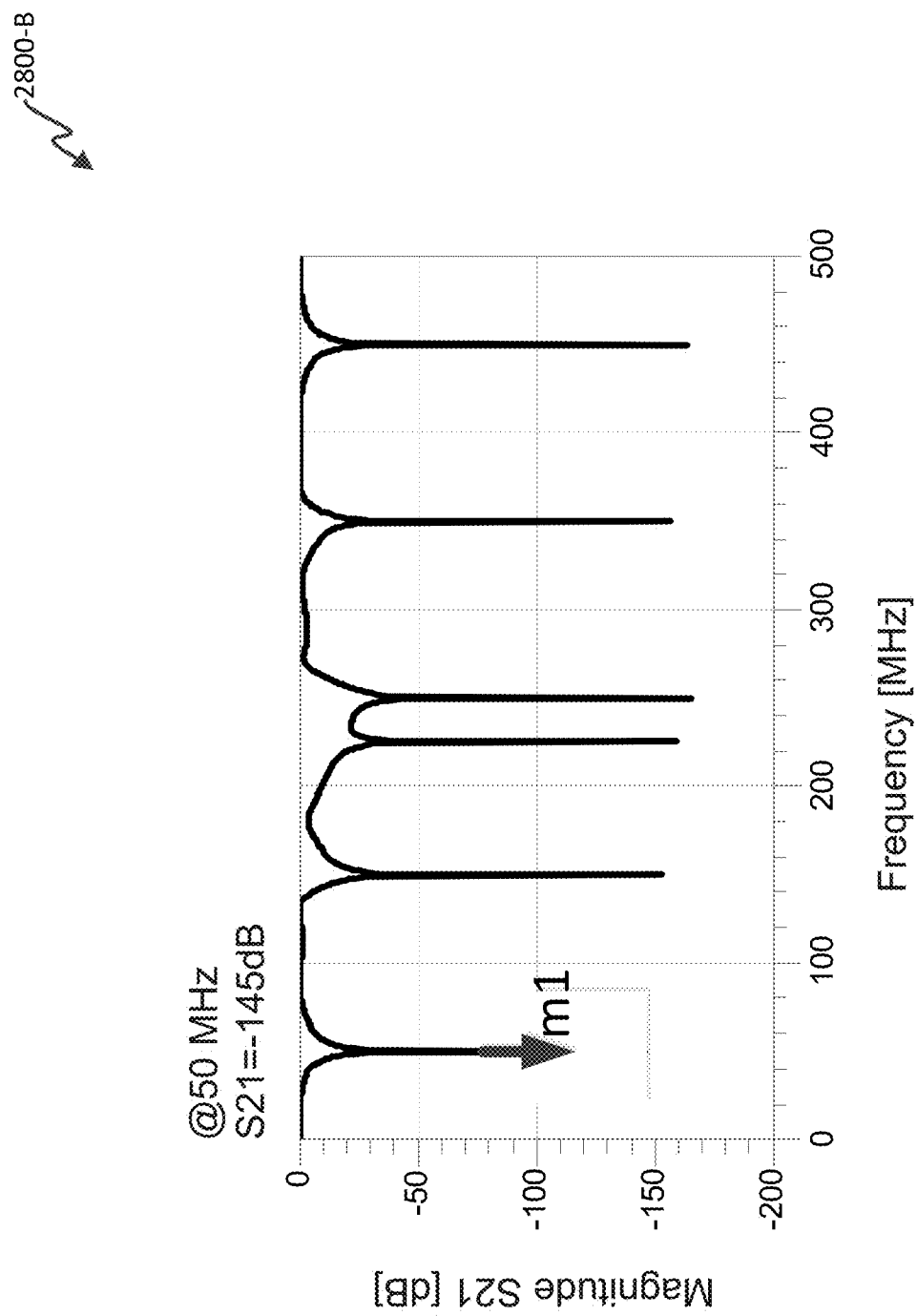

In the following, simulation results for a power line system will be explained. FIG. 28A illustrate a schematic diagram of a power line system having three power lines in series ($Ls_1$, $Ls_2$, and $Ls_3$), each having a characteristic impedance of 75 ohm but with a different electrical length or phase. In this embodiment, the power line system has two separates open stubs, i.e., $Lp_4$ and $Lp_5$, each having the same characteristic impedance 75 ohm. However, the first open stub $Lp_4$ has an electrical length of 90 degrees (quarter wavelength) at 50 MHz while the second open stub $Lp_5$ has a different electrical length which is not quarter wavelength at 50 MHz. Since the open stub $Lp_4$ is a quarter wavelength stub, it will indicate "a short-circuit" at its other extremity. FIG. 28B illustrates the $S_{21}$ parameters as a function of frequency. As explained above and also shown in this figure, the frequency response represents a frequency null at 50 MHz which is denoted by marker m1.

Figure 29A:
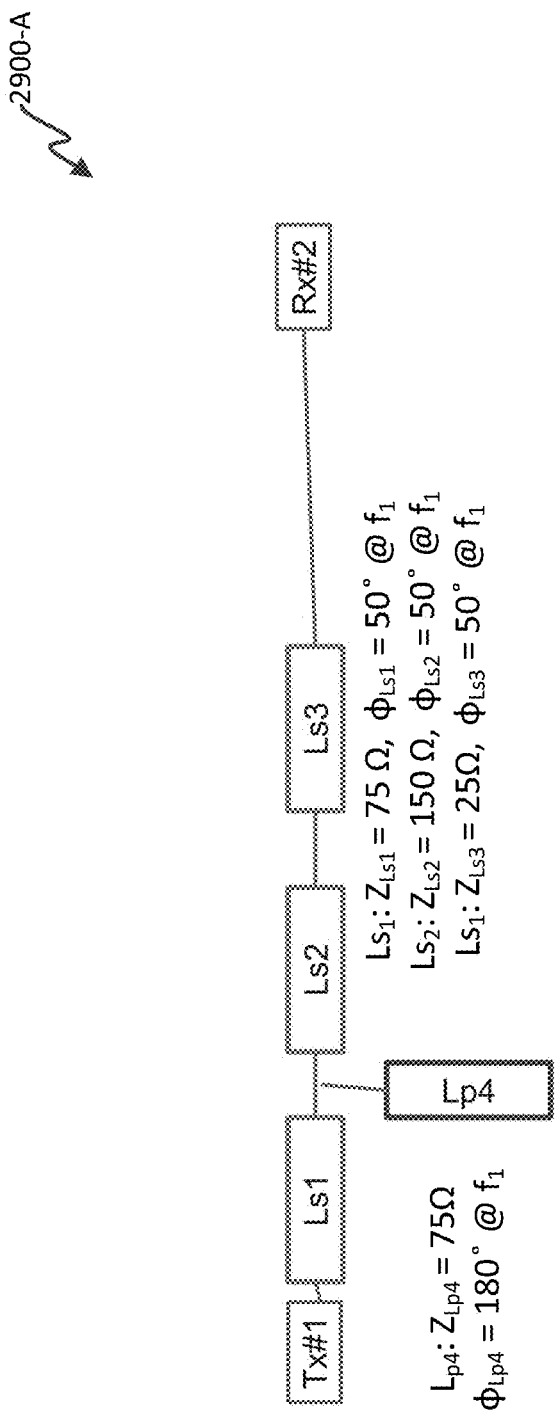
FIGS. 29A and 29B illustrate, respectively, a schematic diagram of an alternative embodiment of a power line system and its frequency response.
Figure 29B:
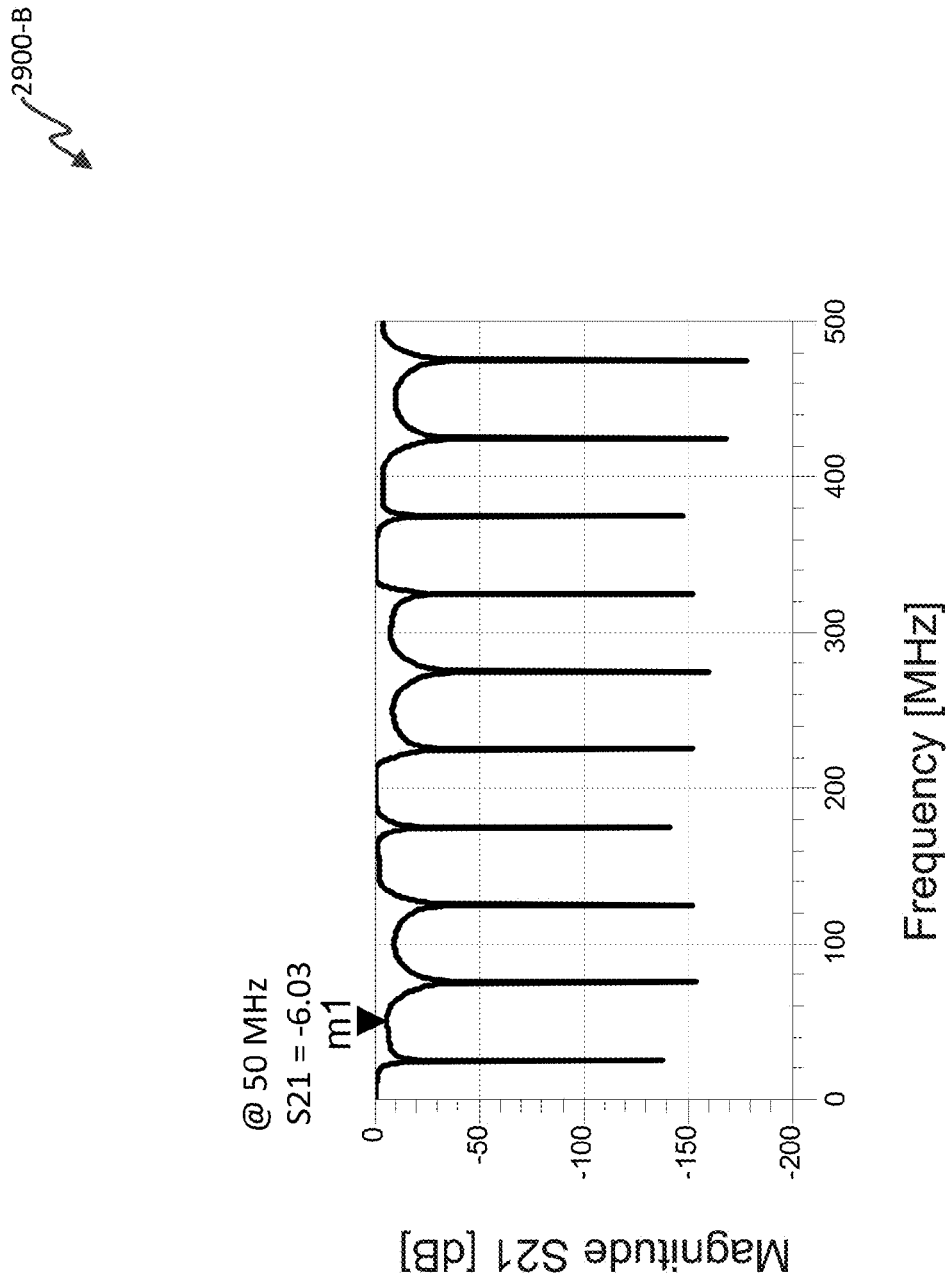

FIG. 29A illustrates a schematic diagram of an alternative embodiment of a power line system. In this alternative embodiment, the power line system includes three power lines in series ($Ls_1$, $Ls_2$, and $Ls_3$), each having the same electrical length or phase of 50 degrees, but with a different characteristic impedance. By way of example, the first power line $Ls_1$ has a characteristic impedance of 75 ohm, the second power line $Ls_2$ has a characteristic impedance of 150 ohm, and the third power line $Ls_3$ has a characteristic impedance of 25 ohm. The power line system further includes one open stub $Lp_4$ with characteristic impedance 75 ohm and electrical length 360 degrees. Since the open stub $Lp_4$ is a full wavelength stub, it will indicate "an open circuit" at its other extremity. Therefore, no frequency null is created at 50 MHz. FIG. 29B illustrates the $S_{21}$ parameters as a function of frequency. As explained above and also shown in this figure, the frequency response does not include any frequency null at 50 MHz, however, an amplitude attenuation of about −6 dB, denoted by marker m1, is observed at 50 MHz. This is mainly due to the impedance mismatches in the power line system.

Figure 30A:
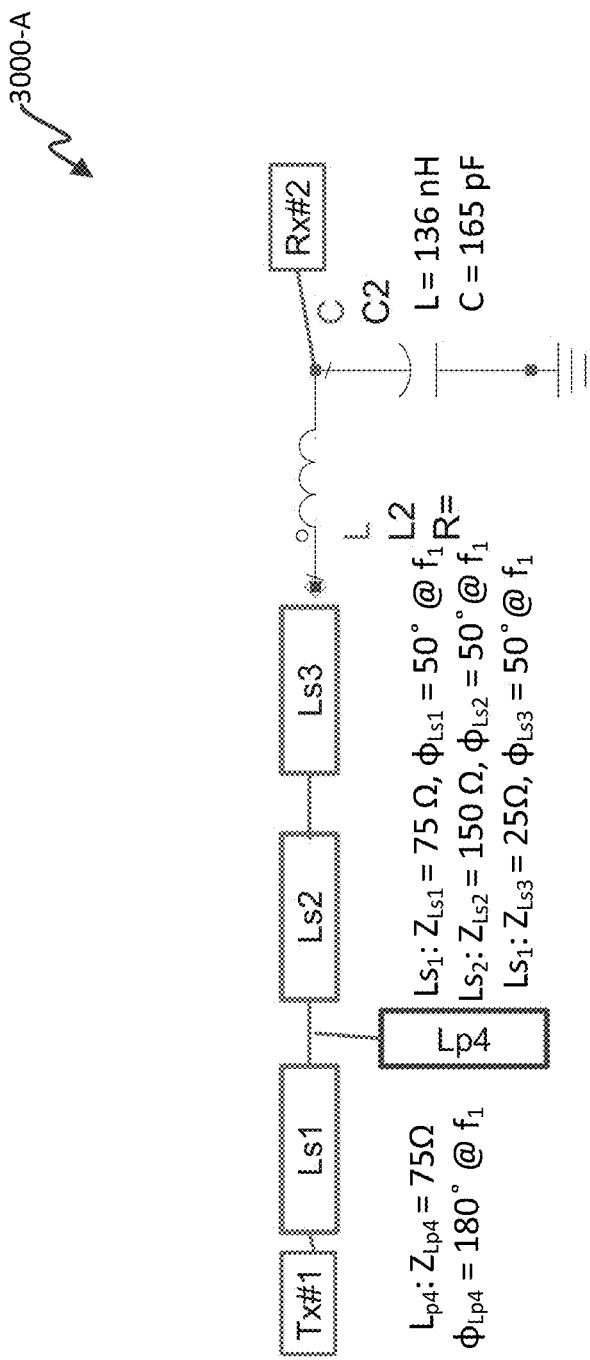
FIGS. 30A and 30B illustrate, respectively, a schematic diagram of a power line system including a line equalizing module (LEM) and its frequency response.
Figure 30B:
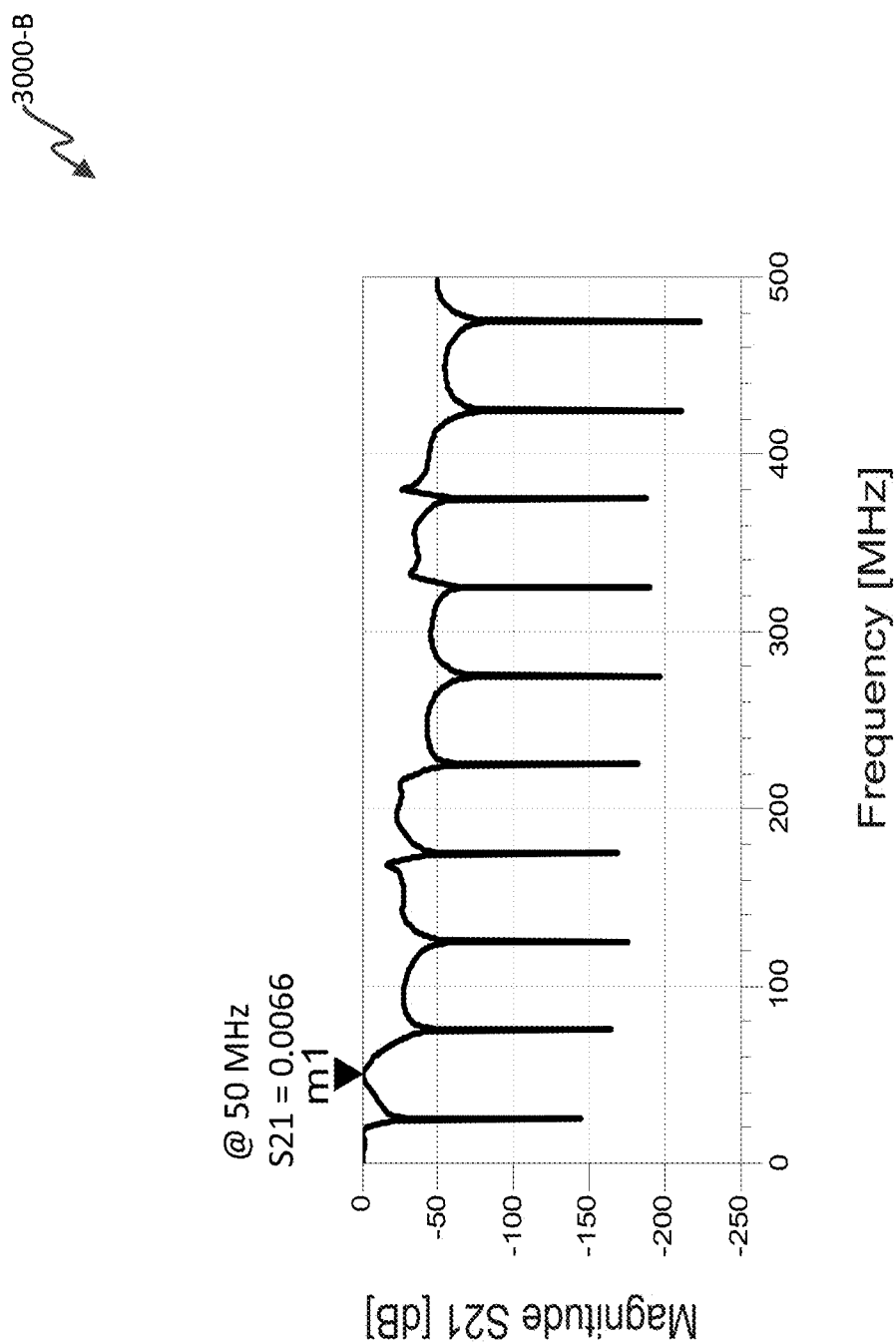

FIG. 30A illustrates a schematic diagram of a power line system including a line equalizing module (LEM). The schematic diagram of FIG. 30A is different from the schematic diagram of FIG. 29A in that a line equalizing module is implemented within the power line system at the receiver (Rx) side. The line equalizing module may include a series inductance of 136 nH and a shunt capacitance of 165 pF for this particular case to compensate for mismatch loss at 50 MHz. FIG. 30B illustrates the $S_{21}$ parameters as a function of frequency. As shown in this figure, the addition of line equalizing module at the receiver side allows for compensating the impedance mismatch of the power line system so that the equalized power line system may offer data transmission with minimal loss. The loss at 50 MHz is about 0.066 dB, which is denoted by marker m1, when a line equalizing module (LEM) is used.

In some rare situations, it is possible that the quality of signal over less than perfect or imperfect transmission lines cannot improve by only matching the impedance of the communication devices, i.e. the transmitter (Tx) and the receiver (Rx), to the impedance of the transmission line. In these situations, it is possible to improve the quality of signal by changing the frequency of operation between the transmitter (Tx) and the receiver (Rx). This is achieved by either up-conversion or down-conversion of frequency within a range of few kHz to a range of few MHz. In the following, some simulation results, performed by an RF-simulator, are shown on the basis of the above-described.

Figure 31:
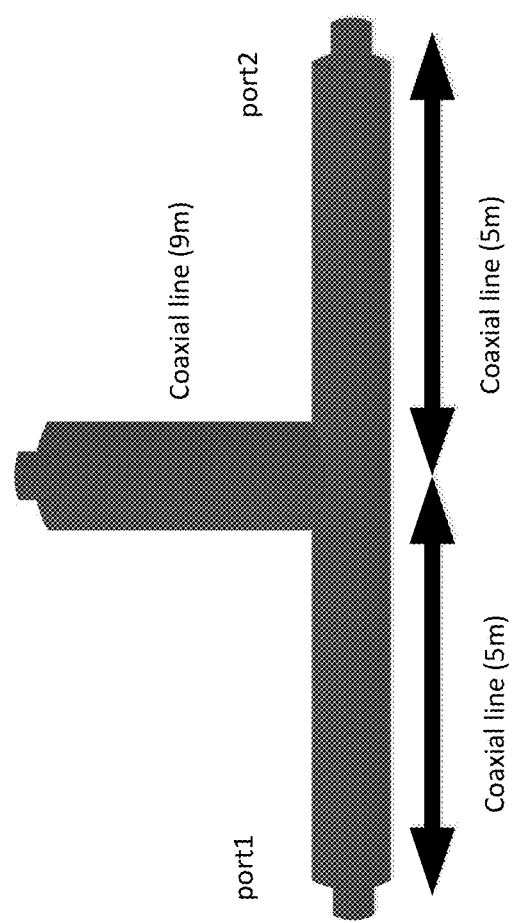
FIG. 31 depicts an example of a coaxial transmission line with an open-ended stub.
Figure 32:
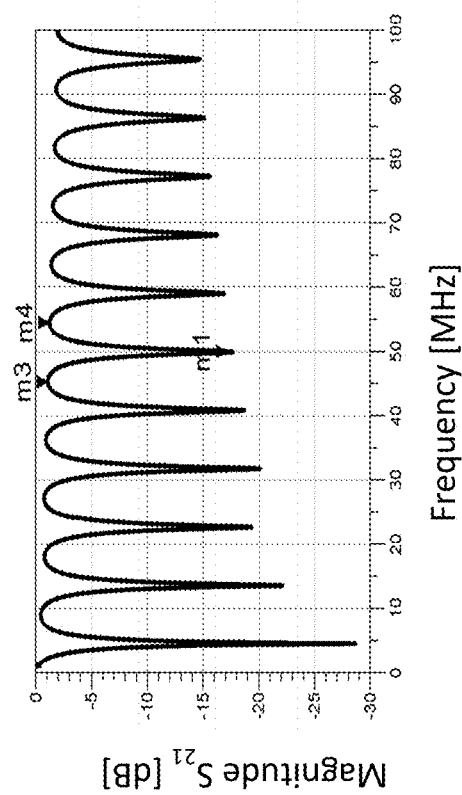
FIG. 32 illustrates S-parameters as a function of frequency for the coaxial line shown in FIG. 31.

Referring now to FIG. 31, an example of a coaxial transmission line with an open-ended stub is shown. In this example, all coaxial cable transmission lines have a characteristic impedance of 75 ohm. As shown in this figure, the open coaxial line stub has a length of 9 m and is located at a distance of 5 meters from each of the transmitter (port1) and the receiver (port2). FIG. 32 illustrates S-parameters as a function of frequency for the coaxial cable transmission lines, shown in FIG. 31. As can be observed from FIG. 32, the data communication is disrupted at 50 MHz due to the existence of the open-ended coaxial line stub which creates a frequency null at 50 MHz. In addition, an amplitude attenuation of about −17 dB is observed at 50 MHz, which is denoted by marker m1.

However, a substantially lower transmission loss may be achieved at the following frequencies: 45 MHz and 55 MHz. As denoted, respectively, by markers m3 and m4, an amplitude attenuation of about −1 dB is observed at 45 MHz while the amplitude attenuation is about −1.2 dB at 55 MHZ. Therefore, by performing a frequency shift of about 5 MHz, it becomes possible to re-establish data communication link between the transmitter and the receiver. Depending on the application, the up-conversion or down-conversion of frequency may be performed using frequency mixers. In some embodiments, the frequency shift may only be performed at the transmitter side. In other embodiments, the frequency shift may only be performed at the receiver side. In the preferred embodiment, the frequency shift may be performed at both the transmitter side and the receiver side. The preferred embodiment allows for establishing the best data link between the transmitter and the receiver.

The function of frequency adjustment may be implemented in conjunction with the line equalizing module within the transceiver. In this way, three parameters, namely: impedance, propagation delay or phase, and the frequency, may be adjusted to optimize the communication link. The impedance and propagation delay or phase may be determined by the LC components, as explained further above. It should be noted that the frequency optimization is performed only when the impedance and the propagation delay or phase adjustment fail to increase the data rate. As described above, the frequency adjustment is performed by up-conversion or down-conversion of the operational frequency.

Figure 33:
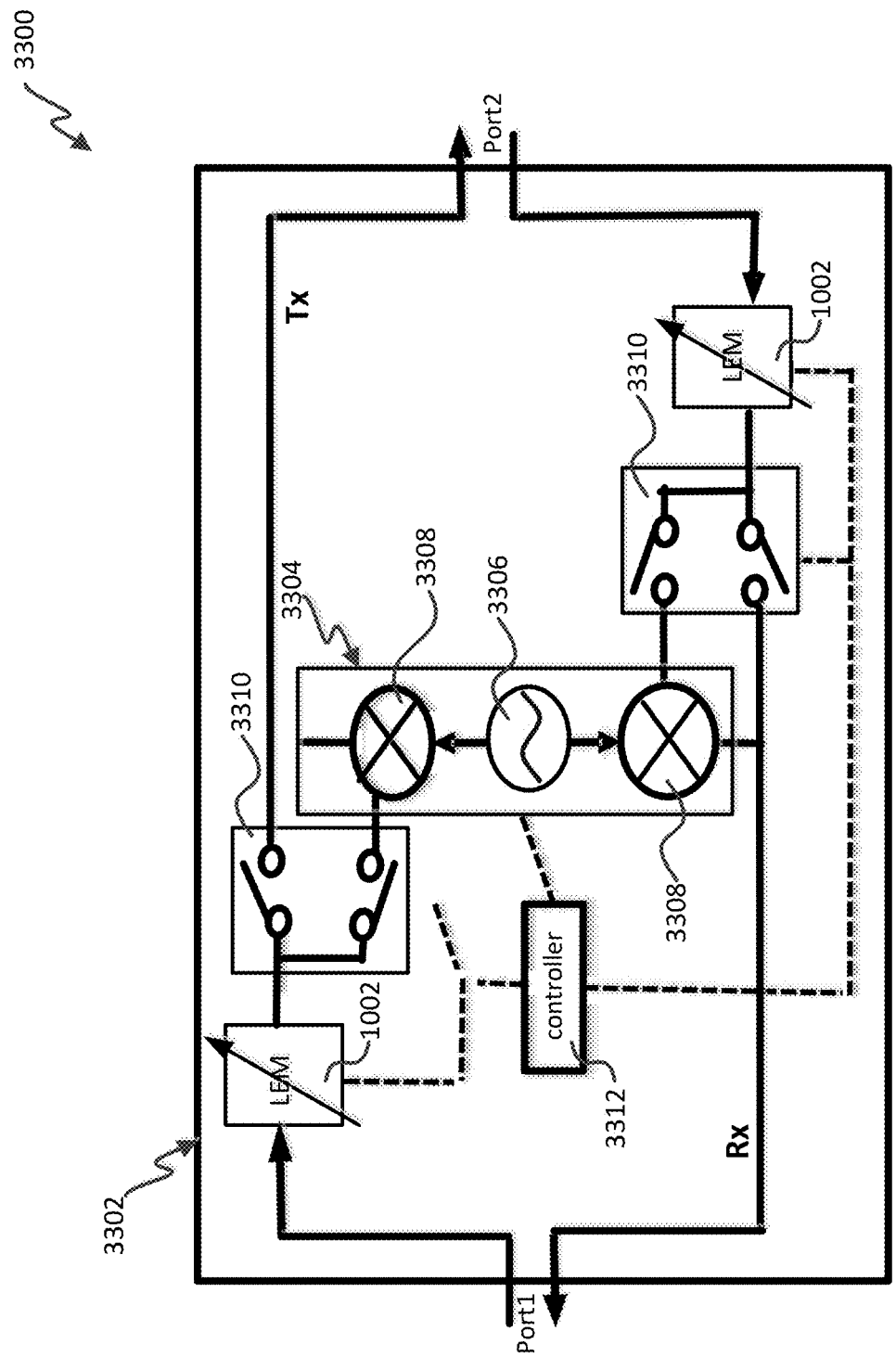
FIG. 33 depicts a schematic diagram of an embodiment of a transceiver for adjusting impedance, phase, and frequency.

With reference to FIG. 33, a schematic diagram of an embodiment of a transceiver 3302 for adjusting impedance, phase, and frequency is shown. The transceiver 3302 may include a controller 3312, a frequency shift unit 3304, and two variable line equalizing modules 1002. The controller 3312 may be any standard central processing unit (CPU) or any microcomputer such as a micro-processing unit (MPU) and a micro-controller unit (MCU). The frequency shift unit 3304 may include one variable oscillator 3306 and two mixers 3308, one for the transmitter path and the other mixer for the receiver path. In the same way, one variable line equalizing module 1002 is implemented in each of the transmitter path and the receiver path. The transceiver 3302 further includes two switching devices 3310 (SW1 and SW2) for connecting each of the transmitter path and the receiver path to the frequency shift unit 3304.

A communication link may include multiple transceivers, and depending on the communication protocol, it may support point-to-point, point-to-multipoint, and multipoint-to-multipoint transmission. Assuming a point-to-point communication link, a transmission signal reaches the port1 of the transceiver and enters the line equalizing module 1002. Then, in response to a control signal, the transmission signal may enter the frequency shift unit 3304 or it may go directly to the port2 of the transceiver 3302. In the next step, the transmission signal propagates through a transmission line to reach the next transceiver 3302 for establishing a point-to-point communication link. The transmission signal may then comeback through port2 of the transceiver 3302 where it will be compared with its initial signal. Depend upon the results of the comparison, the controller 3312 may only adjust the impedance of communication device or it may only adjust the propagation delay or phase of the transmission signal. In addition, the controller 3312 may also effectuate a frequency shift when required. When an acceptable data rate is achieved, the system stays with adjusted values of all three parameters, i.e. impedance, phase, and/or frequency. For purposes of simplicity of visualization, this embodiment shows that the transmitter and the receiver ports, i.e., port1 and port2, are located at two opposite sides of the transceiver 3302. However, in other embodiments, depending on the application, the transmitter and the receiver ports may be located on the same side of the transceiver 3302.

Up until now the discussion above has focused on how implementing a line equalizing module (LEM) on one or several parallel stub may resolve the data transfer disruption. In addition, as explained further above, the line equalizing module (LEM) may be also inserted within the transmission line at the transmitter side and/or at the receiver side, which is the most interesting and practical solution for equalizing a line of communication. It is obviously not practical to search for an open-ended stub or plug within a premises (residential or commercial) or outdoor in both buried and aerial lines. For this purpose, the end user may have to try all the electrical outlets in a building to determine whether the data rate is adequately improved. This process may be automated by adding a means of communication into the line equalizing module (LEM) so that the line equalizing module may communicate with the transmitter and the receiver and the test notification results may be transferred to the end user via the same means of communication The process used for finding faulty open lines within a premises is as follows: 1) Plugging the transceiver power line ONE into the electrical outlet in a desired location, 2) Plugging the transceiver power line TWO into the electrical outlet in a desired location, 3) pressing an initialization button to start the initialization procedure (test speed) for determining the average data rate, between transceiver power lines ONE and TWO, as a function of time, 4) reading the transmission data rate on either the transceiver ONE, the transceiver TWO, the line equalizing module, or a remote user interface, 5) If the data rate is good, pressing the initialization button to close the test mode (in this case, the system is ready for use and no further optimization is needed), 6) if the data rate is fair (underperforming) or not as good as expected (acceptable), adding one or more line equalizing modules at the electrical outlet (open stub) in the dwelling to improve overall data rate, 7) plugging sequentially the line equalizing module in every electrical outlet within each room in the building (Since the system is in test mode, it continuously sends and receives frames for testing the speed), 8) determining the electrical outlet with the highest improvement in the data rate, 9) leaving the line equalizing module at the electrical outlet with the highest improved data rate 10) pressing the initialization button on either or both of transceivers ONE and TWO, or the line equalizing module(s) to close the test mode and start operating in normal mode.

It should be noted that, in step 4, the data rate value may be displayed in different ways. For example, it may be displayed in an absolute value, i.e., 87.8 Mbps, or relative value, i.e.: on a scale of 0-100%, or on a scale of 0 to 5, or simply using an LED with three states: 1) RED "underperforming", 2) orange "acceptable", and 3) green "good". The end user will typically press a button on transceiver One or transceiver TWO to signal that the initialization is completed and the system is ready for use.

In step 7, when the line equalizing module is plugged in, it communicates with either or both of transceivers ONE and TWO while its electrical delay varies automatically. After completing the scan, the line equalizing module stops at its best value, which corresponds to the maximum data rate achieved during the total range of scanning. It should be noted that if the electrical outlet is not the worst open stub, a minor improvement or decrease in data rate is observed. A particular dwelling may have several open stubs and the end user may decide to correct only the worst, or two or three of them. During a prototype test, it was noticed that on 20 various dwellings tested, only one needed as much as three line equalizing modules to achieve a desired average data rate. In most cases, one module was sufficient to achieve the desired average data rate, in some cases two modules was sufficient and only 1-2 houses needed three line equalizing modules.

Figure 34A:
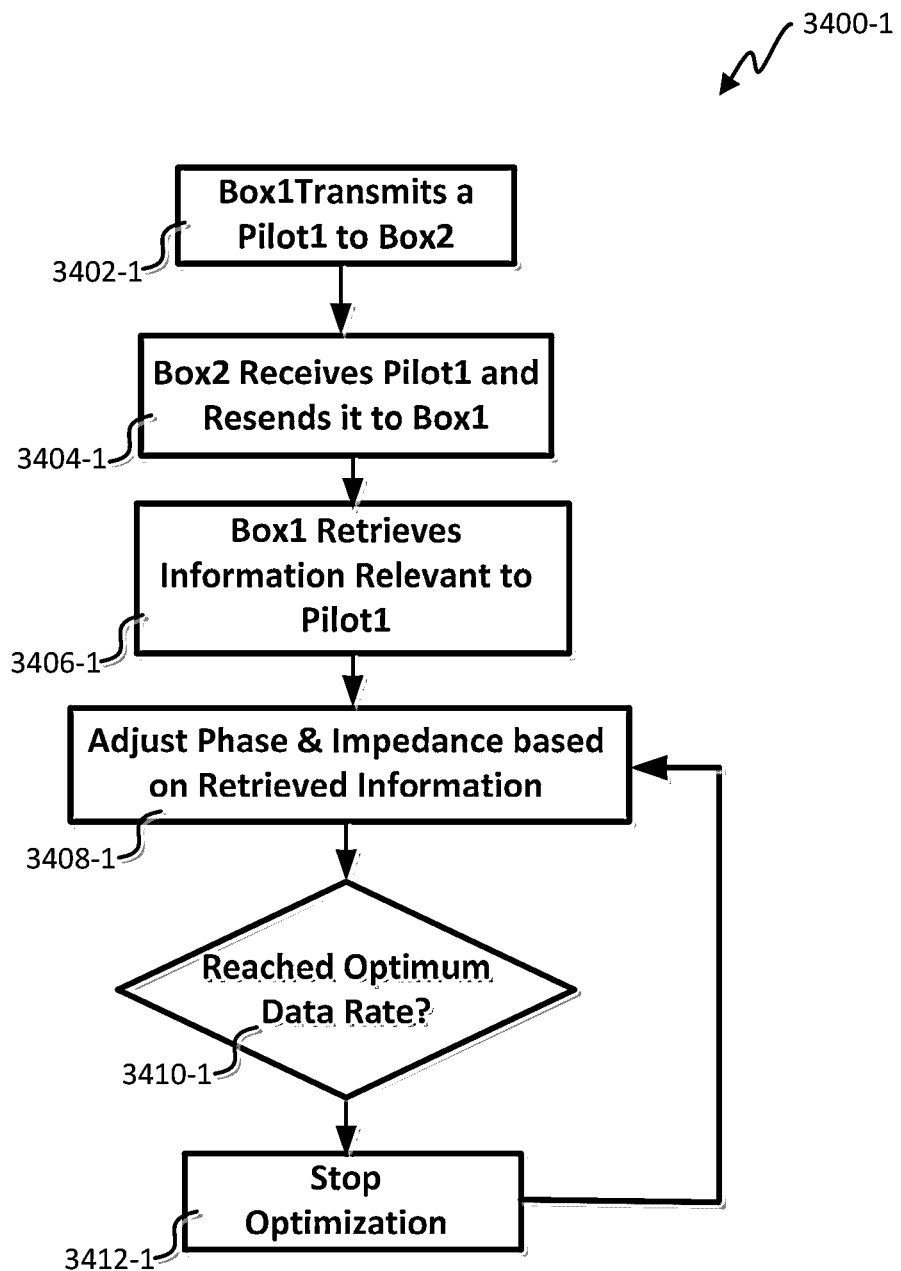
FIGS. 34A and 34B illustrate flow diagrams of example methods for optimizing data rates.

Referring next to FIG. 34A, an embodiment of a process 3400-1 for optimizing data rates is shown. The depicted portion of the process 3400-1 begins in block 3402-1 where a first transmitter in a first transceiver (Tx1/Rx1) transmits a first pilot or a sweep to a second transceiver (Rx2/Tx2). Different type of sweep, such as for example, time domain reflectometer (TDR) sweep may be used in this process. It should be noted that all the transceivers are calibrated in advance. After receiving the first pilot or sweep, the receiver (Rx2) of the second transceiver (Rx2/Tx2) sends back a second pilot, containing information relative to the first pilot, to the first transceiver (Tx1/Rx1). The second pilot will be then received by the transmitter (Tx1) of the first transceiver (Tx1/Rx1) at the block 3404-1.

After receiving the information about the first sweep at the block 3404-1, the transmitter (Tx1) of the first transceiver (Tx1/Rx1) retrieves information relevant to data rate (block 3406-1) and it then enters into a loop for optimizing data rate. The data rate optimization is achieved by adjusting the LC parameters of the line equalizing modules, which in turn changes the impedance and the phase of the transceiver. Different embodiments of the line equalizing modules (400, 500, and 600) may be used at blocks 3408-1 for optimizing the data rate.

A determination is made, at block 3410-1 as to whether the optimized data rate is reached. The determination is made based upon the information sent from the receiver (Rx2) of the second transceiver (Rx2/Tx2). If the optimized data rate is reached, the processing flows from block 3410-1 to block 3412-1 where the optimization process stops and the inductance and capacitance values of the line equalizing module freezes. If the optimized data rate is not reached, the processing goes to block 3408-1 for optimizing the data rate. The exact same process will be taken place on the receiver side for optimizing data rates.

Figure 34B:
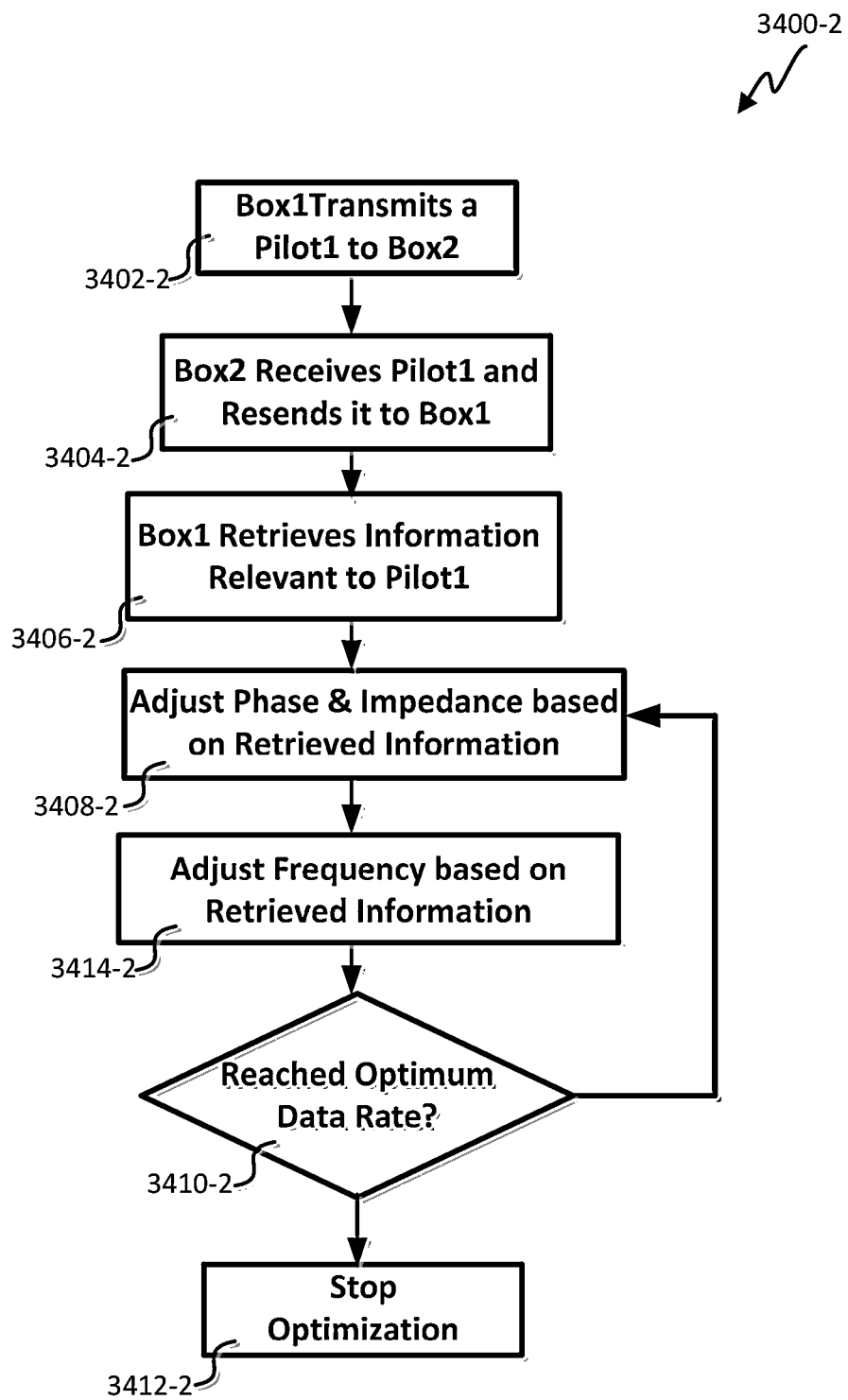

With reference to FIG. 34B, an embodiment of an alternative process 3400-2 for optimizing data rates is shown. This embodiment differs from that of FIG. 34A in that if the optimized data rate does not reach after changing the impedance and the phase of the transceiver, by adjusting the LC parameters of the line equalizing modules, then the optimization processing continues to block 3414-2 where a frequency shift is performed by up-conversion or down-conversion of the operational frequency.

As explained further above, another solution to improve quality of signal over the less than perfect or imperfect transmission lines is to use OFDM modulation to encode digital data on multiple carrier frequencies. Using OFDM modulation allows for easier channel equalization as in OFDM modulation many slowly modulated narrowband signals are used instead of one rapidly modulated wideband signal. The process for using OFDM modulation is as follows: 1) sending OFDM beacon in every subcarrier, determining transfer function and equalizing for each subcarrier, 2) determining the signal-to-noise ratio (SNR), after equalization of each subcarrier, 3) removing data from subcarriers with deep null condition, i.e., more than 20 dB attention, 4) allocating maximum modulation scheme (max data rate) to each subcarrier as a function of its SNR, 5) setting a margin in the minimum SNR for all type of modulations, 6) monitoring periodically the BER and adjusting accordingly data rate allocation for each channel.

For a better understanding of step 5, the following numerical examples may be given. If subcarrier 24 has a SNR of 3 dB, it will be discarded from data since the minimum required SNR is 6 dB for a BPSK (Binary Phase-shift Keying) modulation. A 23 dB SNR, i.e., subcarrier 7, may accommodate a 16 QAM (Quadrature Amplitude Modulation) modulation, which includes a margin of 3 dB. Finally, a 41 dB of SNR, i.e., subcarrier 11, allows for a 256 QAM modulation and it still provides for a 4 dB margin.

While the principles of the disclosure have been described above in connection with specific apparatuses, it is to be clearly understood that this description is made only by way of example and not as limitation on the scope of the invention.

What is claimed is:

1. A frequency null shifting module for improving analog, digital, and radio frequency (RF) transmission over various types of transmission mediums, the frequency null shifting module comprising:
   a plurality of cells, each cell comprising an inductor coupled to a capacitor;
   wherein a first cell is connected to an open-ended stub of a transmission line;
   the frequency null shifting module further comprising:
   a plurality of switches selectively connecting the cells to provide a variable propagation delay for shifting a frequency of a frequency null associated with the open-ended stub; and,
   wherein the plurality of switches comprises single-pole single-throw (SPST) semiconductor switches or SPST mechanical switches.

2. The frequency null shifting module as recited in claim 1, wherein a ratio of inductance to capacitance for each of the plurality of inductor-capacitor cells is kept constant.

3. The frequency null shifting module as recited in claim 1, wherein the variable propagation delay allows for electrically pushing out any null within a frequency range of interest.

4. The frequency null shifting module as recited in claim 1, wherein the variable propagation delay allows for lossless transmission by providing impedance matching between communication devices and the transmission line.

5. The frequency null shifting module as recited in claim 1, wherein a total number of the plurality of inductors is the same as a total number of the plurality of capacitors.

6. The frequency null shifting module as recited in claim 1, wherein a total number of the plurality of switches is equal to two times a total number of the connected cells.

7. A frequency null shifting module for improving analog, digital, and radio frequency (RF) transmission over various types of transmission mediums, the frequency null shifting module comprising:
   a plurality of cells, each cell comprising an inductor coupled to a capacitor;
   wherein a first cell is connected to an open-ended stub of a transmission line;
   the frequency null shifting module further comprising:
   a plurality of switches selectively connecting the cells to provide a variable propagation delay for shifting a frequency of a frequency null associated with the open-ended stub; and,
   wherein the plurality of switches comprises single-pole double-throw (SPDT) semiconductor switches or SPDT mechanical switches.

8. The frequency null shifting module as recited in claim 7, wherein the variable propagation delay allows for electrically pushing out any null within a frequency range of interest.

9. The frequency null shifting module as recited in claim 7, wherein the variable propagation delay allows for lossless transmission by providing impedance matching between communication devices and the transmission line.

10. A frequency null shifting module for improving analog, digital, and radio frequency (RF) transmission over various types of transmission mediums, the frequency null shifting module comprising:
    a plurality of cells, each cell comprising an inductor coupled to a capacitor;
    wherein a first cell is connected to an open-ended stub of a transmission line;
    the frequency null shifting module further comprising:
    a plurality of switches selectively connecting the cells to provide a variable propagation delay for shifting a frequency of a frequency null associated with the open-ended stub; and,
    wherein a total number of the plurality of switches is equal to two times a total number of the connected cells.

11. The frequency null shifting module as recited in claim 10, wherein the variable propagation delay allows for electrically pushing out any null within a frequency range of interest.

* * * * *